(12) United States Patent
Bynum et al.

(10) Patent No.: US 7,825,895 B2
(45) Date of Patent: Nov. 2, 2010

(54) CURSOR CONTROL DEVICE

(75) Inventors: Donald P. Bynum, Heath, TX (US); Gregory A. Magel, Dallas, TX (US); Robert Leo Dawes, Bedford, TX (US); Larry V. Moore, Richardson, TX (US); Minhaj Ahmed, Plano, TX (US)

(73) Assignee: Itac Systems, Inc., Garland, TX (US)

( * ) Notice: Subject to any disclaimer, the term of this patent is extended or adjusted under 35 U.S.C. 154(b) by 1337 days.

(21) Appl. No.: 10/537,525

(22) PCT Filed: Dec. 22, 2003

(86) PCT No.: PCT/US03/40895

§ 371 (c)(1), (2), (4) Date: Jun. 3, 2005

(87) PCT Pub. No.: WO2004/059613

PCT Pub. Date: Jul. 15, 2004

(65) Prior Publication Data
US 2006/0028442 A1 Feb. 9, 2006

Related U.S. Application Data

(60) Provisional application No. 60/435,933, filed on Dec. 20, 2002.

(51) Int. Cl.
G09G 5/00 (2006.01)
(52) U.S. Cl. .................... 345/156; 345/166
(58) Field of Classification Search .......... 345/156–184
See application file for complete search history.

(56) References Cited

U.S. PATENT DOCUMENTS

| | | | |
|---|---|---|---|
| 4,701,747 A | 10/1987 | Isherwood et al. | |
| 4,878,107 A | 10/1989 | Hopper | |
| 4,968,877 A | 11/1990 | McAvinney et al. | |
| 5,175,534 A | 12/1992 | Thatcher | |
| 5,414,256 A | 5/1995 | Gurner et al. | |
| 5,801,681 A | 9/1998 | Sayag | |
| 5,825,352 A | 10/1998 | Bisset et al. | |
| 6,057,540 A | 5/2000 | Gordon et al. | |
| 6,175,610 B1 | 1/2001 | Peter | |
| 6,246,482 B1 | 6/2001 | Kinrot et al. | |
| 6,330,057 B1 | 12/2001 | Lederer et al. | |
| 6,388,247 B2 | 5/2002 | Asada et al. | |
| 6,424,407 B1 | 7/2002 | Kinrot et al. | |
| 6,452,683 B1 | 9/2002 | Kinrot et al. | |

(Continued)

FOREIGN PATENT DOCUMENTS

EP 0957448 A2 11/1999

(Continued)

*Primary Examiner*—Jimmy H Nguyen
(74) *Attorney, Agent, or Firm*—Schultz & Associates, P.C.

(57) ABSTRACT

A method of moving the cursor is used in a computer system having a processor operatively coupled to a cursor control device having a light source and an image sensor for optically tracking motion of the cursor control device. The method is executed to move the cursor according to an enhanced tracking value generated based on a measured tracking value, a projected tracking value, and a tracking confidence value based on an illumination value representative of an intensity of light sensed by the sensor.

16 Claims, 35 Drawing Sheets

U.S. PATENT DOCUMENTS

| | | |
|---|---|---|
| 6,552,713 B1 | 4/2003 | Van Brocklin et al. |
| 6,795,056 B2 * | 9/2004 | Norskog et al. ............. 345/158 |
| 2003/0006367 A1 | 1/2003 | Liess et al. |
| 2003/0098848 A1 | 5/2003 | Jzuhsiang |
| 2003/0098852 A1 | 5/2003 | Huang et al. |
| 2003/0103037 A1 | 6/2003 | Rotzoll |
| 2003/0201951 A1 | 10/2003 | Chin |
| 2003/0205800 A1 | 11/2003 | Kim et al. |

FOREIGN PATENT DOCUMENTS

| | | |
|---|---|---|
| JP | 11-345076 | 12/1999 |
| JP | 2001-195181 | 7/2001 |

* cited by examiner

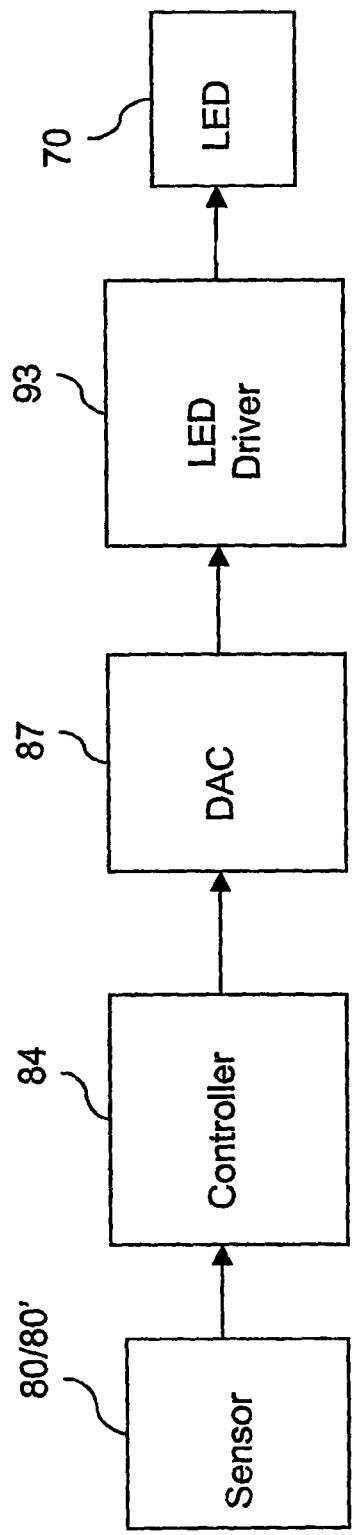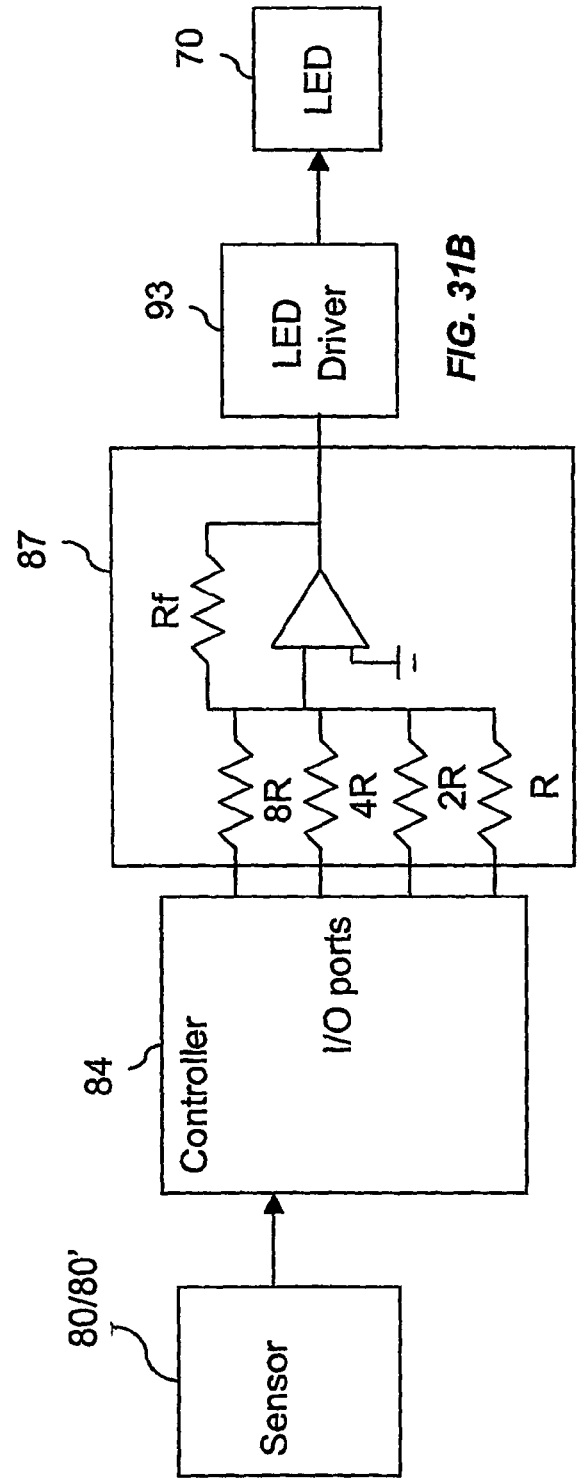

CURSOR CONTROL DEVICE

CROSS-REFERENCE TO RELATED APPLICATIONS

The present application is a 371 of PCT/US03/40895 filed Dec. 22, 2003, which claims the benefit of U.S. provisional application No. 60/435,933, entitled "Cursor Control Device," filed Dec. 20, 2002, by inventors Donald P. Bynum and Gregory A. Magel.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates to input devices for controlling computers or computer-controlled machinery or equipment. More specifically, it relates to a pointing device for controlling the position of a cursor on the display screen of a computer or computer-controlled machinery or equipment.

BACKGROUND OF THE INVENTION

Many types of equipment are now controlled by computers or microprocessors, either incorporated into the equipment or as separate, freestanding controller units. Examples include manufacturing or processing equipment, computer-aided design (CAD) workstations, home computers, entertainment devices such as audio and video players, and game consoles. A common means for interaction is through the use of a software-controlled graphical user interface (GUI) in which the user sees symbolic representations of commands, hardware or software objects, functions, and portions of the equipment. A well-designed GUI can aid in the efficient, intuitive operation of the equipment. Interaction with a GUI requires an input device that the user can manipulate in order to move an on-screen pointer ("cursor") or highlighted area on a graphics display screen. This type of input device is called a cursor control device or pointing device, and it is commonly used either in addition to a conventional text-based input keyboard or by itself.

A wide variety of pointing devices for computer input have been developed to meet different needs. Common needs include comfort during use, precision and speed of cursor placement or motion, and relatively compact size. However, specialized needs and deficiencies in the existing devices have led to the continual invention and development of new cursor control devices optimized for different applications. Examples of factors driving innovation in cursor control devices include the following: enhanced intuitive operation for different applications such as drawing or CAD; convenience for use while standing and giving projected presentations; portability or small size for use with or incorporated into portable or handheld computing devices; the desire for a device that uses a relatively small work area on a desk; accuracy in small motions or speed for large motions; enhanced ergonomic qualities to minimize repetitive stress injury (RSI) and improve user comfort; high reliability in adverse environments; and personal preference. There remains a need for novel cursor control devices that are versatile enough to perform well in a larger combination of the above factors and/or that are specialized to perform particularly well for a specific application.

Most cursor control devices rely on visual feedback of cursor position to the user via the display screen, and they are thus relatively tolerant of motion errors, which are quickly compensated by the user. The most popular variations are the "mouse," a handheld device that is moved relative to a work surface such as the desk, and the "trackball" or "tracker ball," which is much like an inverted version of an optomechanical mouse. The original mouse design used a trapped ball that imparted rotary motion in x and y to rollers coupled to optical shaft encoders, and this is also the way most trackballs work.

A major deficiency of the mouse is that it needs to be grasped in the hand, and this often leads to muscular fatigue. One size and shape does not optimally fit all users. It requires considerable work surface area to be used, and can fall off of tilted or slippery work surfaces. Optomechanical mice have considerable problems with dirt getting into the mechanism.

Trackballs, which also come in a variety of sizes, have some advantages over mice. They take relatively little desk or panel area. More users find the same size trackball easy to get accustomed to, since it does not need to be grasped. Disabled users who lack grasping ability can operate a trackball. Versions are available that have seal rings around the ball to keep out moisture and dirt. Ruggedized trackballs are thus common on manufacturing and medical equipment and in other locations receiving heavy use such as CAD stations. They can often be operated while wearing gloves.

Advancements in low-cost CMOS image sensors and digital signal processing have been applied recently both to the implementation of optical mice and to the sensing of the motion of trackballs. Examples of prior art assemblies used to construct an optical mouse that tracks work surface features are shown in FIGS. 1 and 2. Components useful in implementing such a mouse are commercially available from vendors such as Agilent Technologies. In use, illumination from a light source hits the work surface at a grazing angle to highlight irregularities with shadows, so that the work surface need not have contrasting features to track. A short focal length lens relays a unity magnification image of the work surface onto the image sensor, which has a small array (e.g., 16×16) of photodetectors in an area approximately 1 mm square. The image sensor has image processing hardware that analyzes sequential frames for motion and outputs cursor-motion signals compatible with standard mouse interfaces. Optical mice using this configuration, while having no moving parts, typically are unsealed, using an open hole for optical interface with the work surface instead of a transparent window.

Trackballs are also available using similar motion-tracking electronic imaging technology to sense patterns on the ball. However, although they use modern optical technology, there is still a ball, as well as other moving parts, and hence potential for contamination with dust and liquids, leading to questionable reliability in industrial applications.

There thus remains an unmet need for an improved cursor control device for industrial and other applications, that provides some of the "feel" of a trackball, but with no moving parts required to change the cursor position, that is designed to be capable of operation using much of the whole hand, that can track a variety of surfaces such as gloves, that is compact in size and suitable for mounting in a panel, and that is capable of being substantially sealed from the environment.

When choosing a cursor control device, there are certain desirable characteristics that may be more or less important depending on the particular application. Following is a non-comprehensive list of areas of potential improvement for cursor control devices. While these features are particularly useful in cursor control devices for use in industrial control applications, it should be noted that such features will also be considered desirable in many other applications.

Reliability: no moving parts; sealed enclosure; capable of being constructed from environmentally-resistant materials (chemical, abrasive, cleanable).

Convenience and versatility of installation and operation: capability of panel mounting; compact size; operation in any orientation or position; operation in high-vibration environments; operation in high g-force environments; potential for different visual designs.

Ergonomics: intuitive operation; visual and tactile indication of operation; capable of operation with whole hand and/or arm motion; optimum mounting position and orientation; use with relaxed hand, arm, and fingers, with no grasping for reduced danger of repetitive stress injury; usable by disabled individuals.

Aesthetics: interesting, attractive appearance; potential for different visual design styles and colors; looks "cool" or "high-tech."

SUMMARY OF THE INVENTION

According to one aspect of the present invention, a cursor control device is provided for positioning on-screen pointers or selecting commands on computers or computer-controlled machinery. The cursor control device comprises a housing, a dome or window on the user side of the panel with which the user interacts by touching it or moving in front of it a hand or other object, a light source within the housing or dome to illuminate the hand or other object through a portion of the dome in order to define a sensitive area, imaging optics to image the sensitive area onto an electronic image sensor chip, an image processor to analyze motion of an image and convert the motion information into signals to control a cursor position, and a transmitter for providing an interconnection to a host computer as well as to connect to optional external switches for performing selection or other functions.

In some embodiments, the housing is mountable in a panel or keyboard and has one or more integral clips to hold it into a panel. The dome is in the shape of a portion of a sphere, with the circle where it intersects the front panel surface between 5 and 35 mm in diameter, is made of a rigid plastic material, and protrudes on the user side of the panel by 5 to 15 mm in order to make it obvious both visually and tactilely. The user or front side of the dome has a substantially smooth and continuous surface with a smoother window area having a diameter of from 1 to 6 mm in the center defining a sensitive area. The back side of the dome incorporates features for directing and concentrating the illumination upon the sensitive area at an incident angle that is significantly less than 90 degrees, but large enough to avoid total internal reflection of the illumination. The light source is a light emitting diode at a visible wavelength and is attached to the same printed circuit board as the image sensor chip. Imaging optics transmit an image of a portion of the sensitive area with a magnification near unity onto the image sensor's active area. The image sensor includes an image processor that interprets the image and converts it to a motion signal for output to a host computer. The transmitter consists of an electrical connector that feeds power and signals through the housing. Auxiliary switches to perform "click," "drag" and other functions are separately mounted external to the cursor control device and are connected to the device through additional pins on the same electrical connector. The housing, dome and connector are substantially sealed together in order to exclude particulates, moisture, and other chemical contaminants.

A number of alternative embodiments of the illumination and imaging optics are possible in which multiple optical and structural functions can be combined into a smaller number of parts in order to lower the assembly cost and simplify the structure. For example, some of the illumination optics and imaging optics can be incorporated into one or more features in or on the dome, multiple optical elements can be molded into a single piece, and mechanical positioning and attachment features can be incorporated into the optical elements and/or the housing in order to hold the components in position and alignment. Refractive, reflective, or diffractive optics and different light source geometries can be used.

In alternative embodiments, the housing can be configured to lie in a substantially perpendicular or substantially parallel orientation with respect to a plane of the panel, and the dome can have additional features or textures to provide visual and tactile indication of the position and orientation of the sensitive area. Instead of, or in addition to, grazing incident illumination, the sensitive area can be illuminated more normal to its surface by a different configuration of light source and illumination optics. The dome can be textured to give it diffusing properties, which will make the device relatively insensitive to the motion of objects that are not close to, or in contact with, the surface of the dome closest to the user. Additional light sources or decorative textured or colored features can be provided to enhance the aesthetics and ergonomics of the device. Switches or other controls can be integrally combined with the housing and/or dome of the basic cursor positioning device to provide selection or other additional functions in addition to cursor pointing.

According to another aspect of the invention, a cursor control device is provided that has a dome-within-a-dome construction. Such a cursor control device comprises an outer shell having a sensitive region for interaction with a user, an inner housing nested in the outer shell, and a sensor disposed within an interior of the inner housing for generating signals based on the user interaction with the sensitive region of the outer shell. In such a cursor control device the outer shell can be a convex dome having a diameter in a range from 10 mm to 80 mm, or more preferably from 25 mm to 60 mm. The outer shell can include a window defining a region of the outer shell that includes the sensitive region. In some embodiments, the window is flat. The window can be provided with a layer of a scratch-resistant coating and/or the window can be made of a scratch-resistant material, such as glass or sapphire. The outer shell can include a material for selective filtering of ambient light. For example, the material can be such that it filters visible light and transmits near-infrared light. Also, the sensitive region of the outer shell can be a flat window made of the material for selective filtering, such as material that filters visible light and transmits near-infrared light, and the outer shell can include a second material for blocking ambient light. The cursor control device can further include a filter element for selectively transmitting light to the sensor. The filter element can be disposed within the inner housing along a light path between the sensitive region of the outer shell and the sensor. The filter element can disposed between the outer shell and the inner housing along a light path between the sensitive region of the outer shell and the sensor. In either case, the filter element can be such that it transmits only light having a wavelength within a first range of wavelengths, and the material for selective filtering used for the outer shell and/or sensitive region of ambient light can be such that it transmits only light having a wavelength within a second range of wavelengths. The outer shell can be interchangeable with a second outer shell. This would allow, for example, for the second range of wavelengths to be altered by a user, for cleaning and maintenance, and/or for changing the appearance of the device by using a second outer shell of a different color or design.

In this cursor control device, the interior of the inner housing can be fluidly sealed from an exterior of the inner housing. This provides an additional degree of protection for components disposed within the inner housing. The outer shell can be removable from the cursor control device, and since the inner housing is sealed the outer shell can be removed and/or replaced without exposing the components disposed within the inner housing to the environment the inner housing remains fluidly sealed when the outer shell is removed.

Also, this cursor control device can have the inner housing formed so as to include an integral lens portion having an optical axis that intersects the sensitive region of the outer shell. The cursor control device can include a light source disposed within the interior of the inner housing for illuminating a region proximate to the sensitive region of the outer shell, and the integral lens portion can be an illumination lens disposed along an optical axis of the light source between the light source and the sensitive region of the outer shell. On the other hand, the integral lens portion can be an imaging lens disposed along an optical axis of the sensor between the sensor and the sensitive region of the outer shell. Another option is to include both the integrated illumination lens and integrated imaging lens both formed into the inner housing.

According to another aspect of the present invention, an optical engine for a cursor control device is provided that includes a housing, an imaging lens element integrally formed into the housing, a light source disposed within the housing for emitting light along an illumination optical axis, and a sensor disposed within the housing for sensing light along an imaging optical axis that intersects the imaging lens element. The optical engine can further include an illumination lens element integrally formed into the housing, wherein the illumination optical axis intersects the illumination lens element. The light source can be a light emitting diode, for example that emits infrared light. The imaging lens element can be such that it focuses light from a focal plane onto the sensor, wherein an angle between the illumination optical axis and the focal plane is in a range from 0 degrees to 45 degrees, more preferably from 15 degrees to 35 degrees, and most preferably 30 degrees. The optical engine can further include a filter element disposed along the imaging optical axis for selectively transmitting light to the sensor. The filter element can be disposed between the imaging lens and the sensor. The filter element can be such that it transmits infrared light and prevents transmission of visible light.

The sensor can be an optical sensor, for example one that includes an array of photodetectors or any type of sensor that detects the presence of visible light, infrared transmission (IR), and/or ultraviolet (UV) energy, and includes a type of semiconductor having a property called photoconductivity, in which the electrical conductance varies depending on the intensity of radiation striking the material. Known types of suitable sensors include the photodiode, the bipolar phototransistor, and the photoFET (photosensitive field-effect transistor). These devices typically are configured allow radiant energy to reach the junctions between the semiconductor materials inside, and in some cases provide amplification and/or processing in addition to their sensing capabilities.

The optical engine can include a window disposed external to the housing and positioned such that it is intersected by both the illumination optical axis and the imaging optical axis. The optical engine can also include a filter element disposed between the window and the sensor along the imaging optical axis for selectively transmitting light to the sensor. The filter element can be disposed external to the housing between the window and the imaging lens or disposed within the housing between the imaging lens and the sensor. Another option is that the window is a filter element for selectively transmitting light to the sensor, for example where the window transmits infrared light and prevents transmission of visible light. The optical engine can include a second filter element disposed between the window and the sensor along the imaging optical axis for selectively transmitting light to the sensor. The second filter element can be disposed between the window and the imaging lens or disposed between the imaging lens and the sensor.

According to another aspect of the present invention, a cursor control device is provided that includes an outer shell having a convex dome that includes a centrally located sensitive region for interaction with a user, an inner housing having a complementary convex dome nested in the convex dome of the outer shell, and a sensor disposed within an interior of the inner housing for generating signals related to motion proximate to the sensitive region of the outer shell. The complementary convex dome of the inner housing can have a centrally located depression aligned with the sensitive region. The upper opening of the depression can be at least as big as an expanse of the sensitive region. The sensitive region can have a longitudinal dimension in a range of 0.5 mm to 3 mm, preferably 1 mm. The cursor control device can include a light source for illuminating the sensitive region. The light source can be a light emitting diode, and/or the light source can be one that emits infrared light. The cursor control device can include a controller for controlling the intensity of light emitted by the light source. The controller can control the intensity of light in order to optimize the dynamic range of the sensor. The controller can control the intensity of light based on a signal from the sensor, such as a shutter value signal and/or a contrast signal. The cursor control device can include a filter element for selectively transmitting light to the sensor. The filter element can be such that it blocks visible light and/or transmits only infrared light. The filter element can be configured such that it defines a region of the outer shell that includes the sensitive region. The cursor control device can include a second filter element disposed between the window and the sensor for selectively transmitting light to the sensor. The filter element can be disposed within the centrally located depression of the inner housing. Also, the filter element can be disposed between the inner housing and the sensor.

The outer shell can include a window that defines a region of the outer shell that includes the sensitive region. The window can be integrally formed in the outer shell. The window can be fixed into a depression in the outer shell. The window can be fixed within a through-hole in the outer shell. An upper surface of the window can be flush with an upper surface of the outer shell.

The cursor control device can include an imaging lens disposed between the sensor and the sensitive region. The imaging lens can be integrally formed into the inner housing.

The cursor control device can include a light source having an optical axis that intersects the sensitive region and an illumination lens disposed between the light source and the sensitive region. The illumination lens can be integrally formed into the inner housing.

The inner housing can be fluidly sealed. The inner housing can include an upper dome portion, a base, and a seal between the upper dome portion and the base.

The sensor can be an optical sensor and can include an array of photodetectors as discussed above.

The cursor control device can include a controller for processing the signals generated by the sensor. The controller can include means for determining a tracking confidence value, means for determining a projected tracking value using, a historical tracking value, and means for determining an enhanced tracking value using the tracking confidence value and at least one of the projected tracking value and a measured tracking value representative of motion sensed by the sensor. The tracking confidence value can be determined using an illumination value representative of an intensity of light sensed by the sensor, and the cursor control device can include means for determining said illumination value using a shutter value received from the sensor for a subject sensor scan and a brightness value indicative of an amount of light emitted from the light source during the subject sensor scan.

The various means can be embodied in numerous ways as would be appreciated by one skilled in the art, such as one or more processing devices and/or components thereof that interpret and carries out the instructions contained in software and/or functions according to physical integrated circuit construction and can include devices such as microprocessors having components such as caches and input/output controllers in one or more physical integrated circuit.

The enhanced tracking value can be calculated such that if the tracking confidence value is a first value then the enhanced tracking value is equal to the measured tracking value, and if the tracking confidence value is a second value then the enhanced tracking value is equal to the projected tracking value. The enhanced tracking value can be calculated such that if the tracking confidence value is a third value then the enhanced tracking value equals a weighted combination of each of the measured tracking value and the projected tracking value. The measured tracking value can be representative of motion sensed by the sensor during a subject sensor scan, and the historical tracking value can be related to at least one sensor scan prior to the subject sensor scan. The historical tracking value can be calculated based on the enhanced tracking value for said sensor scan prior to the subject sensor scan. The illumination value can be representative of an intensity of light sensed by the sensor during the subject sensor scan. The cursor control can include means for providing the enhanced tracking value to a client device for control of cursor motion. The cursor control device can include means for storing the enhanced tracking value in memory. The means for determining the projected tracking value can use a previously stored enhanced tracking value as a basis for determining the historical tracking value.

According to another aspect of the invention, a cursor control device includes a light source for illuminating a sensitive region, a sensor for sensing motion in the sensitive region, a confidence calculation section for determining a tracking confidence value, a projection calculation section for determining a projected tracking value using a historical tracking value, and an enhancement calculation section for determining an enhanced tracking value using the tracking confidence value and at least one of the projected tracking value and a measured tracking value, the measured tracking value being representative of the motion sensed by the sensor. The sensor can provide a pair of measured tracking values representative of the sensed motion, the projection calculation section can be configured to determine a pair of projected tracking values using respective historical tracking values, and the enhancement calculation section can be configured to determine a pair of enhanced tracking values, each of the pair of enhanced tracking values being calculated using the tracking confidence value, a respective one of the pair of historical tracking values, and a respective one of the pair of measured tracking values. Each of the pair of measured tracking values, projected tracking values, historical tracking values, and enhanced tracking values can be representative of motion in a respective one of a pair of orthogonal directions. The confidence calculation can use illumination information received from the sensor that includes a shutter value and uses a brightness value indicative of an amount of light emitted from the light source. The measured tracking value can be representative of motion sensed by the sensor during a subject sensor scan, and the historical tracking value can be related to at least one sensor scan prior to the subject sensor scan. The historical tracking value can be calculated using the enhanced tracking values for said at least one sensor scan prior to the subject sensor scan. The illumination information can be representative of an intensity of light sensed by the sensor during the subject sensor scan. The cursor control device can include a memory for storing the enhanced tracking value. The projection calculation section can use a previously stored enhanced tracking value as a basis for determining the historical tracking value. The enhanced tracking value can be calculated such that if the tracking confidence value is a first value then the enhanced tracking value is equal to the measured tracking value, and if the tracking confidence value is a second value then the enhanced tracking value is equal to the projected tracking value. The enhanced tracking value can be calculated such that if the tracking confidence value is a third value then the enhanced tracking value equals a weighted combination of each of the measured tracking value and the projected tracking value. The cursor control device can include an adaptive illumination control section for controlling the intensity of light emitted by the light source. The adaptive illumination control section can control the intensity of light in order to optimize the dynamic range of the sensor. The adaptive illumination control section can control the intensity of light based on a shutter value signal received from the sensor and/or based on a contrast signal received from the sensor. The illumination information can be based on the information received from the sensor and an intensity at which the adaptive illumination control section is controlling the light source.

According to another aspect of the invention, a processor is provided for a cursor control device having a light source and a sensor. The processor comprises means for determining a tracking confidence value, means for determining a projected tracking value using a historical tracking value, and means for determining an enhanced tracking value using the tracking confidence value and at least one of the projected tracking value and a measured tracking value, the measured tracking value being representative of motion sensed by the sensor.

The sensor can provide a pair of measured tracking values representative of the sensed motion, the means for determining the projected tracking value can determines a pair of projected tracking values using respective historical tracking values, and the means for determining an enhanced tracking value can determine a pair of enhanced tracking values, each of the pair of enhanced tracking values being calculated using the tracking confidence value, a respective one of the pair of historical tracking values, and a respective one of the pair of measured tracking values. Each of the pair of measured tracking values, projected tracking values, historical tracking values, and enhancement tracking values can be representative of motion in a respective one of a pair of orthogonal directions.

The confidence calculation section can determine the tracking confidence value using an illumination value representative of an intensity of light, and the processor can include means for determining said illumination value using a shutter value received from the sensor and/or a brightness value indicative of an amount of light emitted from the light source.

The enhanced tracking value can be calculated such that if the tracking confidence value is a first value then the enhanced tracking value is equal to the measured tracking value, and if the tracking confidence value is a second value then the enhanced tracking value is equal to the projected tracking value. The enhanced tracking value can be calculated such that if the tracking confidence value is a third value then the enhanced tracking value equals a weighted combination of each of the measured tracking value and the projected tracking value.

The measured tracking value can be representative of motion sensed by the sensor during a subject sensor scan, and the historical tracking value can be related to at least one sensor scan prior to the subject sensor scan. The historical tracking value can be calculated based on the enhanced tracking value for said at least one sensor scan prior to the subject sensor scan. The illumination value can be representative of an intensity of light sensed by the sensor during the subject sensor scan. The processor can include means for providing the enhanced tracking value to a client device for control of cursor motion. The processor can include means for storing the enhanced tracking value in memory. The means for determining the projected tracking value can use a previously stored enhanced tracking value as a basis for determining the historical tracking value.

The processor can include an adaptive illumination control means for controlling the intensity of light emitted by the light source. The adaptive illumination control means can control the intensity of light in order to optimize the dynamic range of the sensor. The adaptive illumination control means can control the intensity of light based on a shutter value signal received from the sensor and/or a contrast signal received from the sensor. The illumination value can be based on the information received from the sensor and an intensity at which the adaptive illumination control means is controlling the light source.

According to another aspect of the invention, a method of processing cursor control data for a cursor control device having a light source and a sensor is provided. The method comprising the step of performing a confidence calculation for determining a tracking confidence value. The method also comprises the step of performing a projection calculation for determining a projected tracking value, the projection calculation involving a historical tracking value. The method further comprises the step of performing an enhancement calculation for determining an enhanced tracking value, the enhancement calculation involving the tracking confidence value, the projected tracking value, and a measured tracking value, the measured tracking value being representative of motion sensed by the sensor. The sensor can be one that provides a pair of measured tracking values representative of the sensed motion. In this case, the step of performing a projection calculation can be for determining a pair of projected tracking values using respective historical tracking values, and the step of performing an enhancement calculation can be for determining a pair of enhanced tracking values, each of the pair of enhanced tracking values being calculated using the tracking confidence value, a respective one of the pair of historical tracking values, and a respective one of the pair of measured tracking values. Each of the pair of measured tracking values, projected tracking values, historical tracking values, and enhanced tracking values can be representative of motion in a respective one of a pair of orthogonal directions.

The confidence calculation can involve an illumination value representative of an intensity of light sensed by the sensor, and the method can further comprise the step of performing an illumination calculation for determining said illumination value, the illumination calculation involving a shutter value received from the sensor for a subject sensor scan and a brightness value indicative of an amount of light emitted from the light source during the subject sensor scan.

The enhancement calculation can be such that if the tracking confidence value is a first value then the enhanced tracking value is equal to the measured tracking value, and if the tracking confidence value is a second value then the enhanced tracking value is equal to the projected tracking value. The enhancement calculation can also be such that if the tracking confidence value is a third value then the enhanced tracking value equals a weighted combination of each of the measured tracking value and the projected tracking value.

The measured tracking value can be representative of motion sensed by the sensor during a subject sensor scan, and the historical tracking value can be related to at least one sensor scan prior to the subject sensor scan. The historical tracking value can be calculated using the enhanced tracking value for said at least one sensor scan prior to the subject sensor scan. The illumination value can be representative of an intensity of light sensed by the sensor during the subject sensor scan.

The method can further comprising the step of providing the enhanced tracking value to a client device for control of cursor motion. The method can further comprising the step of storing the enhanced tracking value. The steps of performing a confidence calculation, performing a projection calculation, and performing an enhancement calculation can be repeated using the stored enhanced tracking value as a basis for determining the historical tracking value.

The method can further comprising the step of controlling the intensity of light emitted by the light source. The step of controlling the intensity of light can include controlling the intensity of light in order to optimize the dynamic range of the sensor. The step of controlling the intensity of light can include controlling the intensity of light based on a shutter value signal received from the sensor and/or a contrast signal received from the sensor. The illumination value can be based on the information received from the sensor and an intensity at which the light source is controlled during the step of controlling the intensity of light.

According to another aspect of the invention, a cursor control device is provided that comprises a first sensor, a light source, and a controller that includes means for receiving intensity information indicative of an intensity of sensed light, and an adaptive illumination control means for controlling the intensity of light emitted by the light source based on the intensity information. The adaptive illumination control means can control the intensity of light in order to optimize the dynamic range of the first sensor. The adaptive illumination control means can control the intensity of light based on a shutter value signal received from the first sensor. The adaptive illumination control means can control the intensity of light based on a contrast signal received from the first sensor. The intensity information can be received from the first sensor, or it can be received from a second sensor in which case the adaptive illumination control means can control the intensity of light in order to optimize the dynamic range of the first sensor.

BRIEF DESCRIPTION OF THE DRAWINGS

The present invention is illustrated by way of example and is not limited by the figures of the accompanying drawings, in which:

FIGS. 31A and 31B show examples of a hardware implementation that can be used to perform the process shown in FIG. 30;

DETAILED DESCRIPTION OF THE INVENTION

Figure 3:
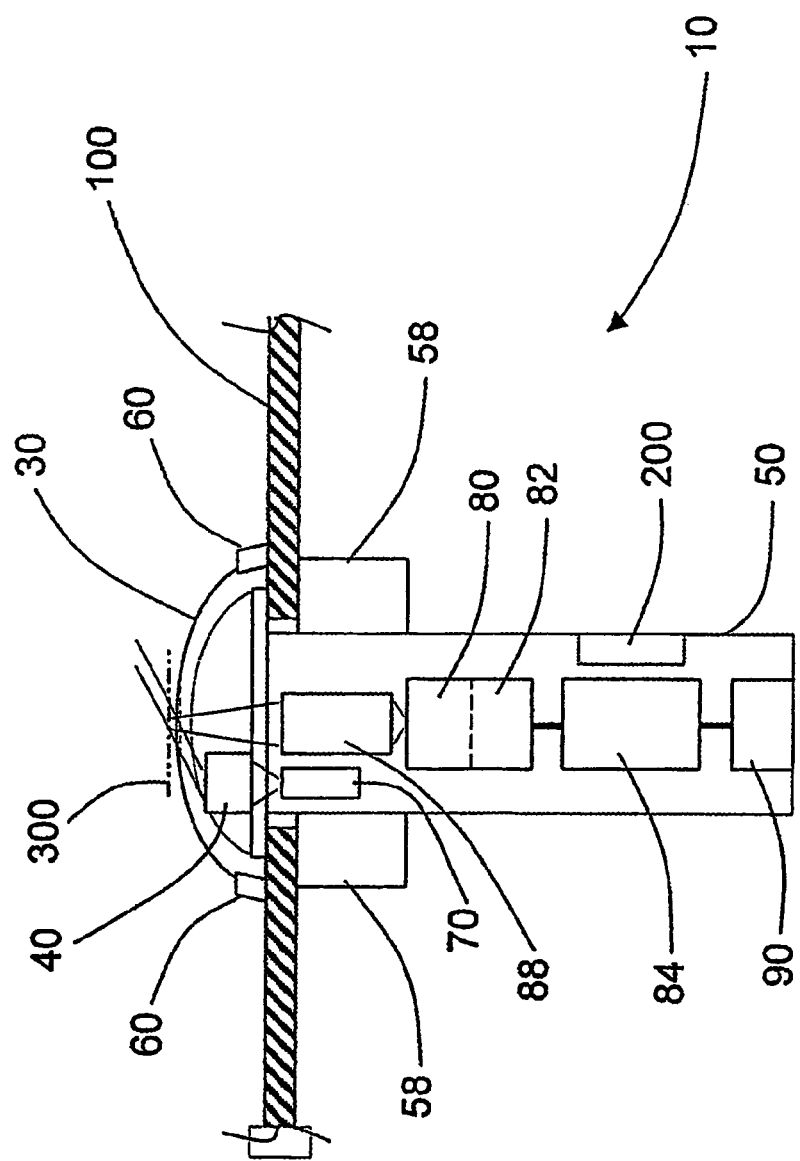
FIG. 3 is a block diagram of a cursor control device according to the present invention showing the general functional and positional relationship of the parts.

A cursor control device 10 will first be described with reference to FIG. 3, which shows a generalized block diagram displayed schematically as a side cross-sectional view of a panel-mounted device in order to indicate the general relationship between the elements of the device. The device has a housing 50 which can be held into a hole through panel 100 by one or more attachments 58. Light source 70 emits radiation at a wavelength to which the image sensor 80 is sensitive. Illumination optics 40 redirect and focus the radiation onto optical object plane 300. This object plane 300 is arranged to be proximate or superimposed with a top surface of a dome 30, which provides an optical window. Preferably, in an industrial environment or the like, the dome seals the optical system from the environment as well as provides tactile and visual features with which the user interacts. Imaging optics 88 form a real image of the object plane 300 on the photosensitive portion of image sensor 80, which converts the optical features into signals. An image sensor chip can incorporate image sensor 80 as well as an image processor 82 to analyze motion of the image and convert it into signals used for controlling cursor motion. Alternatively, the image processor 82 could be separate from the image sensor 80. Controller 84 converts signals from the image processor 82 into a certain form, and performs other functions such as merging these signals with signals sensed by auxiliary controls such as switches external to the cursor control device 10. These auxiliary controls would typically be used, for example, as mouse buttons to be used in performing conventional selection and functions such as "click" and "drag." By incorporating interfaces to these buttons within the controller 84 in the cursor control device 10, a single interconnection point to the host computer or system from cursor control device 10 can be used. This interconnection is indicated schematically by transmitter 90, which can be, for example, a wired electrical connection, a wireless transmitter, or incorporate both for connection to the auxiliary controls as well as to a host system. Transmitter 90 can also serve to bring power to cursor control device 10, or a self-contained power supply 200 such as a battery can be provided within the housing. Bezel 60 can be purely decorative and aesthetic, or can perform one or more practical functions. Possible practical functions of the bezel can include indicating the orientation of the cursor motion axes, a structural function helping to hold dome 30 to housing 50, or perhaps serving as an auxiliary means to aid in the attachment of the cursor control device 10 to panel 100.

Figure 4:
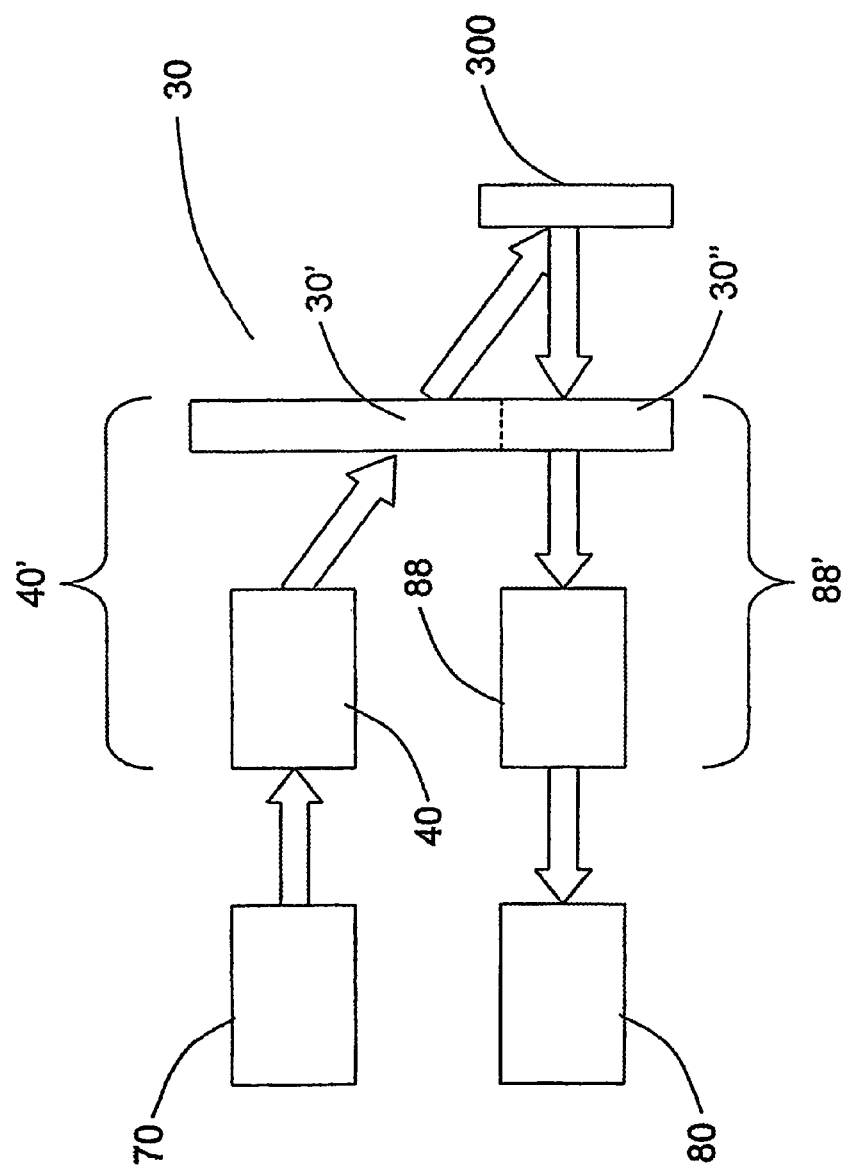
FIG. 4 is a schematic block diagram of the optical system for a cursor control device.

A schematic block diagram of the optical system of a cursor control device is shown in FIG. 4. Optical elements or subsystems are represented by rectangular blocks, and the flow of optical radiation energy used in illumination and imaging is indicated schematically by arrows. Following the flow of this radiation, light source 70 emits optical radiation at a wavelength at which image sensor 80 is sensitive. The emitted radiation is conditioned by illumination optics 40 and is transmitted through dome 30 to illuminate object plane 300. Part of the radiation scattered by an object in object plane 300 traverses dome 30 again and is collected by imaging optics 88 which form an image of the illuminated object on the image sensor 80. Image sensor 80 detects the image, and preferably, processes it to produce a signal amenable to further processing by an image processor (not shown in this diagram).

Opportunities for integration of several optical functions into single pieces or implementation of some of these optical functions into dome 30 are indicated by "primed" reference numerals in FIG. 4. Dome 30 can act as a simple window to protect the workings of the cursor control device, in which its optical functionality is minimized. However, in the name of miniaturization or manufacturability, additional optical functions can be integrated into the dome. Features related to the illumination subsystem that can be integrated into the dome are schematically indicated by region 30' of the dome. Features related to the imaging subsystem are indicated by region 30" and are separated in the schematic by the dashed line, indicating that these features can be separated physically or just functionally within or upon the structure of the dome. Generalized illumination subsystem 40' includes dome illumination features 30' together with contemplated additional illumination optical elements 40. Likewise, generalized imaging subsystem 88' includes dome imaging features 30" together with contemplated additional imaging optical elements 88.

Functions that can be performed by the illumination optics 40 and 30', or 40', include condensing, to collect and focus radiation from the light source; redirecting, through the use of an element such as a mirror or lightpipe, in order to change the direction of the illumination to a certain angle; focusing or shaping, to further define the illuminated area and to limit a spatial volume that is illuminated so as to maximize brightness at the object plane 300 as well as to limit the depth of the illuminated volume; and a homogenizer, to improve uniformity of the illumination throughout the spatial volume containing the object plane. The imaging optics include imaging lenses or mirrors to form an image of the object plane of a certain magnification and image quality on the image sensor, prisms, mirrors, or diffractive elements to change the direction of the optical axis, which can be useful in folding the optical system to make it more compact; and, optionally, a diffuser to aid in limiting the depth of field of the imaging optics. The function of a diffuser, as well as structures in dome 30 that can be used to aid in some of these functions, are discussed later. In some embodiments, dome 30 acts as a simple window for illumination, but incorporates a diffuser to limit the depth of field of the imaging optics. Other optical elements pertaining to illumination and imaging are preferably incorporated into a separate piece or pieces from the dome.

Figure 5:
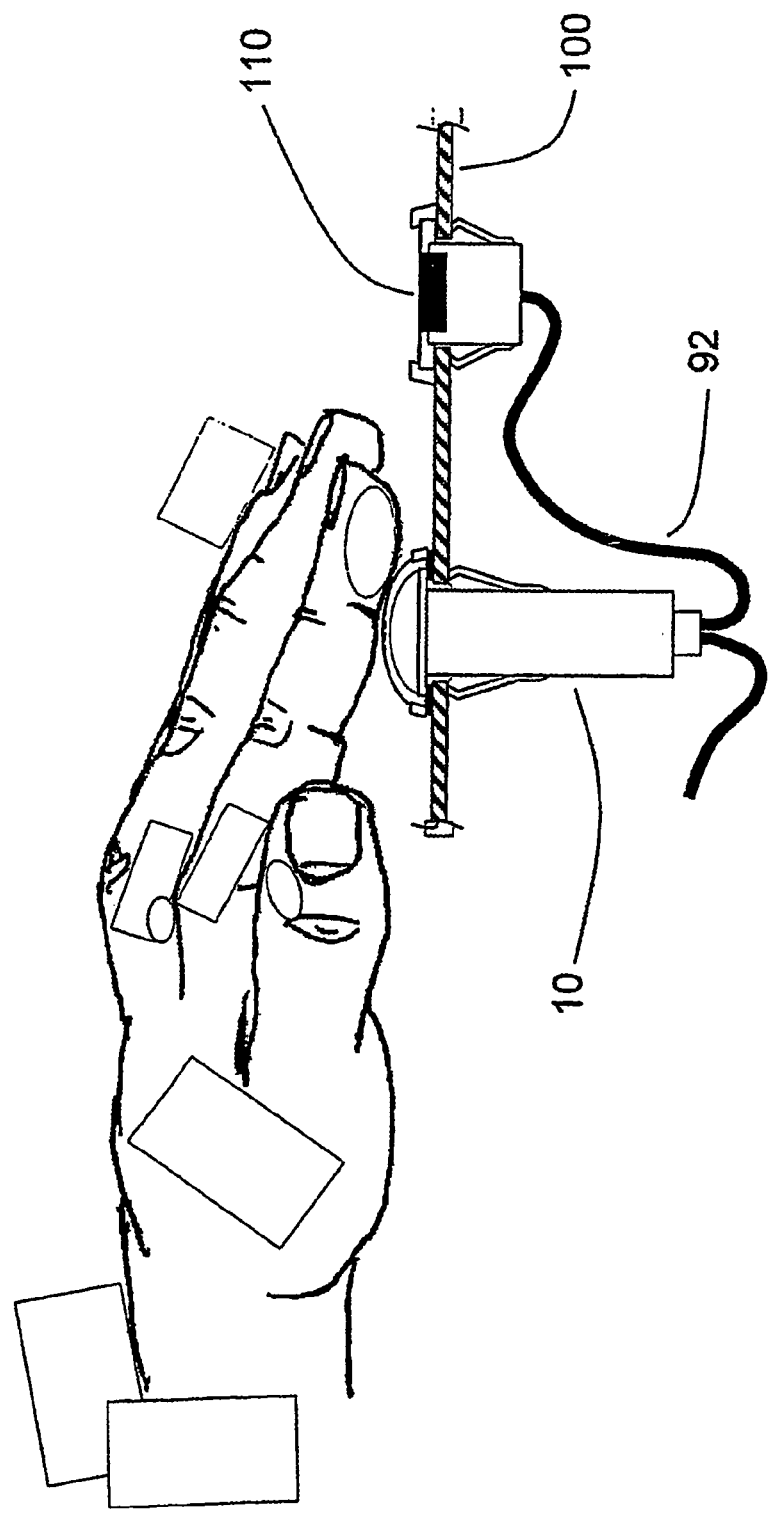
FIG. 5 shows a cursor control device according to the present invention in use while mounted in a panel and interconnected to an auxiliary switch.

FIG. 5 shows a cursor control device 10 as it can be used while mounted in a panel 100. A user "strokes" the device, i.e. the user's appendage, for example, a bare or gloved hand, palm, or fingertip is brushed against the top surface of the dome in order to move a cursor on a host system's display screen. If the appendage is withdrawn from the dome a short distance, the cursor control device is designed to stop tracking, and to be insensitive to the motion of the appendage, or to variations in the lighting or motion of objects in the distance, so that the cursor remains fixed in position. Ways in which the depth of field of the device can be limited will be discussed later. Auxiliary control 110 such as a switch for initiating functions, processes, or selecting actions of the host system is connected to cursor control device 10 through wiring harness 92. This allows the cursor control device 10 to coordinate cursor control and selection functions and to be connected by a single cable to the host system. Multiple auxiliary controls may be desirable, each having a connection to cursor control device 10. The image processing circuitry 82 within the cursor control device can be configured to provide information about the proximity of the appendage to the object plane 300 (refer again to FIG. 3), and can interpret motions in and out of the object plane as "tapping" to perform selection and other functions. Auxiliary control 110 could be obviated or supplemented through the use of such a feature. In use, the motion of the cursor on the host system display screen is preferably arranged through appropriate encoding of the cursor control signals to respond in an intuitive way to the motion of the user's hand. In most cases, this means that the cursor will move in the corresponding direction to the user's hand: i.e., to the left and right on the display screen when the user's hand moves to the user's left and right, respectively, and toward the top and bottom of the display screen, respectively, when the user's hand moves "forward" or "upward" (towards the fingertips) and "backward" or "downward" (towards the elbow).

Dome 30, as implied by its name, is preferably convex, possibly approximating the shape of a portion of a sphere, and protrudes toward the user side of the panel 100. The diameter of the dome is preferably between 5 and 30 mm, and it preferably protrudes above the front plane of the panel to a height of between 2 and 15 mm, depending on the diameter. A practical diameter for the dome, given existing sizes of the electrical and optical components such as the image sensor chip, is between 15 and 25 mm. With this diameter dome, a height of 10 to 15 mm would be appropriate. These dimensions provide a trackball-like feature that can be easily felt without the user having to look directly at the cursor control device, and to allow operation by a relaxed, slightly cupped palm as well as by fingertips. However, in its function as a window, dome 30 could alternatively be flatter, completely flat, or slightly convex. A flat dome could be mounted flush with the front surface of a flat panel or raised above the panel surface in a bezel. If the panel has a shape other than flat, the dome surface could be conformal to the panel shape in order to "blend into" the panel. A slightly convex dome, whether flush or raised from the panel, would encourage a user to operate the cursor control device using only his or her fingertips, which can be desirable in special applications where only fine motions are desired.

Figure 6:
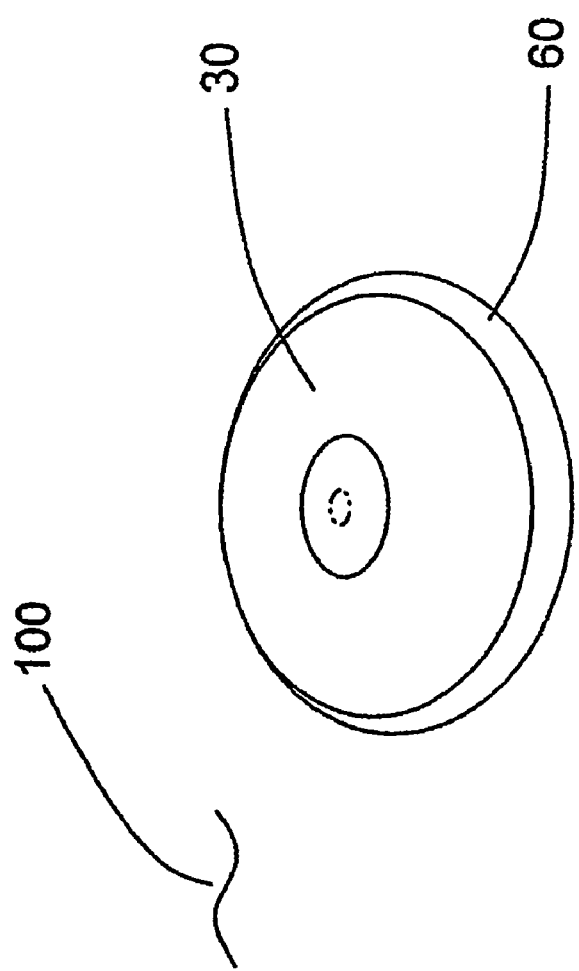
FIG. 6 shows a perspective view of the appearance of a cursor control device from the user side of a panel in which the device is mounted.

FIG. 6 shows a perspective view of the cursor control device as seen from the user side of panel 100, indicating how the dome 30 can be surrounded by a bezel 60 for a finished appearance and to aid in elevating the front surface of the dome to the desired height above the panel.

Figure 7:
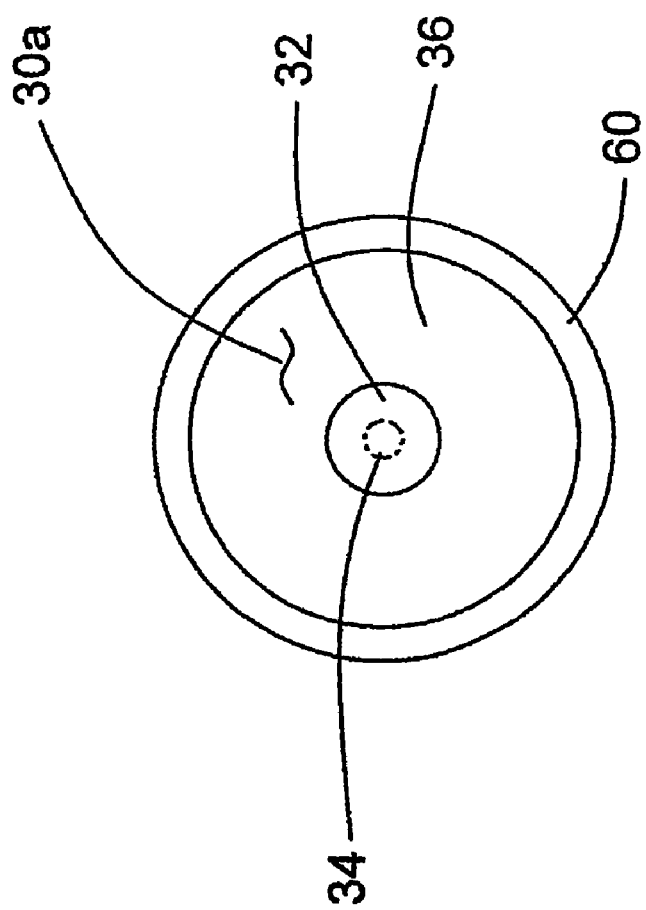
FIG. 7 is a plan view of a cursor control device as seen from the user side of a panel in which the device is mounted.

FIG. 7 is a plan view of the cursor control device as seen from the user side of panel 100. The actual shape of the dome 30 is preferably circular from this aspect, although other shapes such as ellipses, squares, rectangles or other convex curves or polygons are contemplated. Aside from bezel 60, areas and features of the front surface 30a of dome 30 are illustrated for further reference. The region marked 34 within the double-dashed circle indicates the area that is imaged onto the photosensitive portion of the image sensor 80, and will be called the "sensitive area" of the cursor control device. This is a portion of the region 32 that can be illuminated by the light source 70 for sensing. Region 32 will be referred to as the "window" area. There may or may not be visible features separating the window region from the outer ring region. Window 32 is preferably of optical quality for good imaging and transmission of illumination. In order to provide uniform illumination and some tolerance to imaging system misalignment, it is desirable for the window to be at least as large as the sensitive area 34. The area of the dome at larger radii, that is between the window 32 and the outer edge of the dome towards the bezel, will be referred to as the "outer ring" 36 of the dome. In general, the side of the dome toward the user will be called the "front" and the side of the dome toward the image sensor will be called the "back." In some embodiments, the outer ring 36 need not be transparent or of particularly high optical quality on the front surface of the dome. Alternative embodiments of the dome will be described in more detail later.

Figure 8:
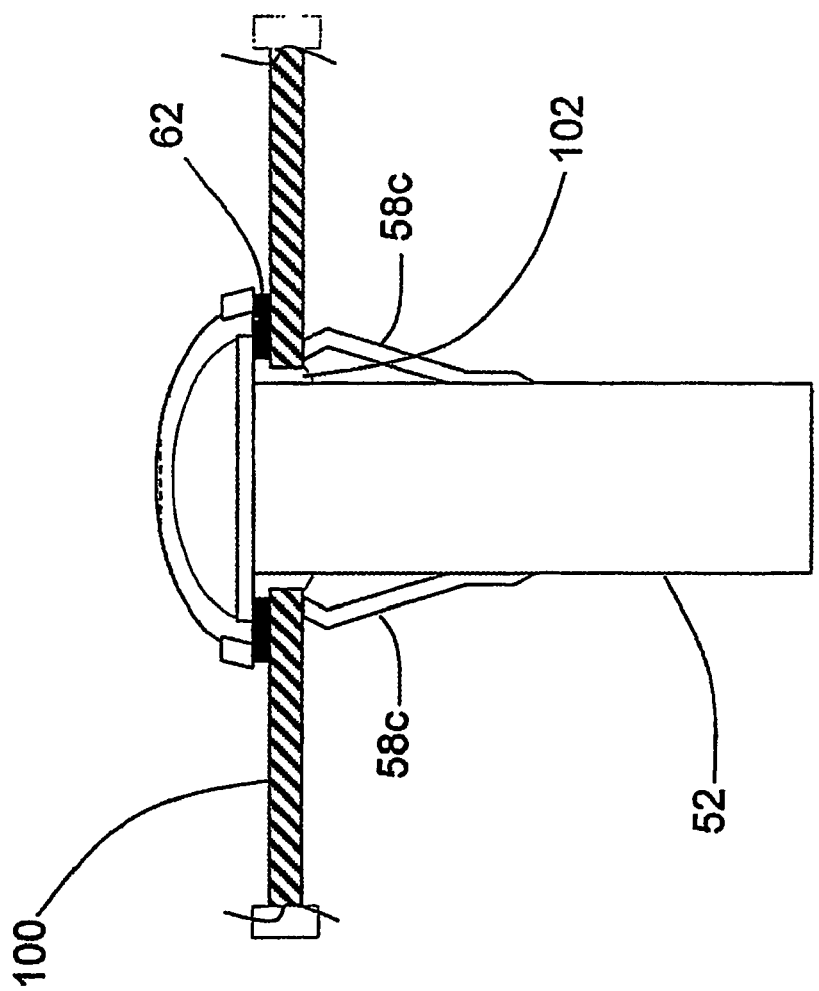
FIG. 8 is a side cross section view of a cursor control device mounted in a panel showing a clip for retaining the device in the panel.

We will now describe some mechanical details regarding the construction and mounting of the cursor control device. We first discuss attachment 58 for affixing cursor control device 10 in what we will call a "vertical" orientation in which the long axis of the device is perpendicular to the surface of a panel. FIG. 8 shows an embodiment of the cursor control device in which the attachment 58 used for fixing device 10 into a hole 102 in panel 100 takes the form of one or more spring clips 58c affixed to, or fabricated integrally to, perhaps of the same material as, housing body 52. With properly designed clips 58c and hole 102, housing body 52 can be inserted from the front side of panel 100, and the clips will expand after insertion to hold the cursor control device firmly in place. An optional gasket 62 is shown in FIG. 8 to aid in sealing the panel 100, thereby preventing communication of liquid or particulate contaminants between the front and back sides of the panel.

Figure 9:
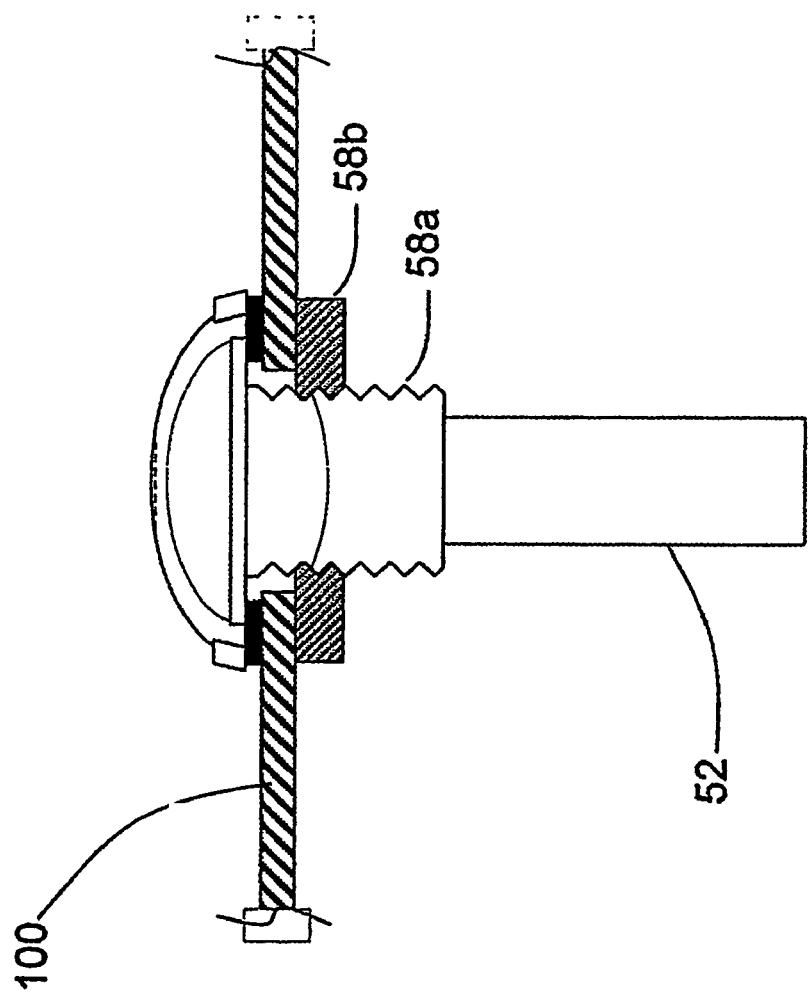
FIG. 9 is a side cross section view of a cursor control device mounted in a panel showing a thread and nut for retaining the device in the panel.

FIG. 9 shows an alternate mounting scheme in which the attachment 58 includes threads 58a formed onto housing body 52 and a panel mounting nut 58b. Advantages include a more positive sealing action, but disadvantages include a more restrictive design requiring housing body 52 to have a smaller diameter or lateral cross-section than the threads, and the inconvenience during installation from having to reach the back side of panel 100. It is contemplated that other attachment schemes such as using friction metal spring clips are also possible.

Figure 10:
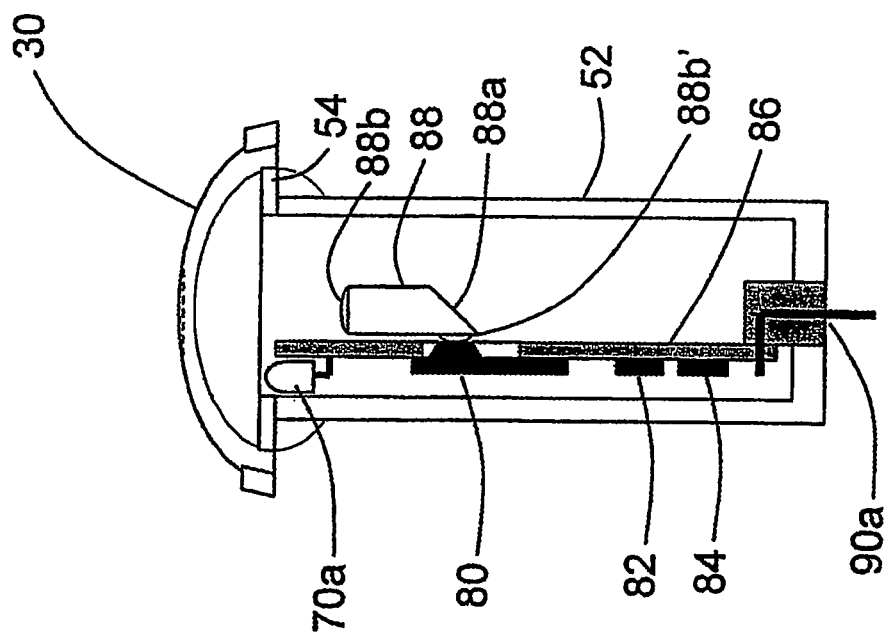
FIG. 10 is a schematic cross section of a cursor control device showing a more detailed arrangement of components within the device.

We now consider the internal construction of the cursor control device in more detail. FIG. 10 shows a schematic cross-section of a vertically oriented device in which a light source 70a, for example an LED (light-emitting diode), is used as a primary light source. The illumination provided by the light source 70a is preferably incident at a low (more grazing) angle to the object to be sensed (we will refer to this as low-angle illumination). The lateral dimensions (parallel to the plane of the panel) of the overall device can be kept compact by mounting the image sensor 80 so that its long axis is along a long axis of the housing body 52. The image sensor 80 is preferably a solid-state device, such as an image sensor integrated circuit (IC) or "chip." This embodiment shows the use of a single substrate or printed circuit board (PCB) 86 on which all optical and electronic components (except for the dome) are mounted. Light source 70a can be a conventional leaded device with its leads bent to allow mounting at a right angle (emitting parallel instead of perpendicular to PCB 86), or a special right angle mounting version. Dome 30 is attached to a flange 54 on housing body 52. The entire assembly or parts thereof can be held together by a combination of glue, screws, fusion, molding, or snap-together features. Electronic components can be mounted to the PCB 86, such as image sensor 80, components of the image processing 82 and interface circuitry 84, primary light source 70a, and electrical connector 90a, which serves as a transmitter. Details of the illumination optics are not shown that could be used to properly condition the light from light source 70a and direct it to the window. Imaging optics 88 are shown as a single multifunction element including both a right-angle image prism 88a and imaging lenses 88b and 88b'. Such a multi-function element can be formed in a single piece using plastic molding techniques.

Figure 11:
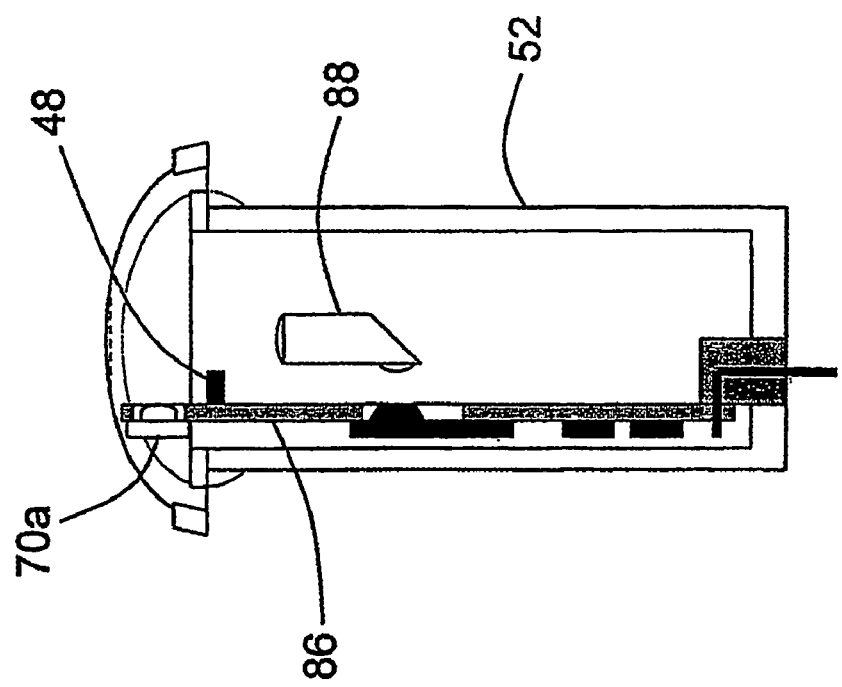
FIG. 11 is a schematic cross section of a cursor control device showing the use of a surface mount LED as a light source.

FIG. 11 shows a slightly different version of a vertically oriented device in which light source 70a is of the surface mount type emitting through a hole in the PCB 86. In this orientation, low-angle illumination is easier to achieve without additional illumination redirecting optics, but a baffle 48 can be desirable to prevent direct access of stray radiation into the imaging optics. Not shown in this figure is a means for supporting and aligning imaging optics 88 within the housing. Mechanical support and alignment features (not shown) could be fabricated onto the optical piece 88, into the housing body 52, or as separate pieces.

Figure 12:
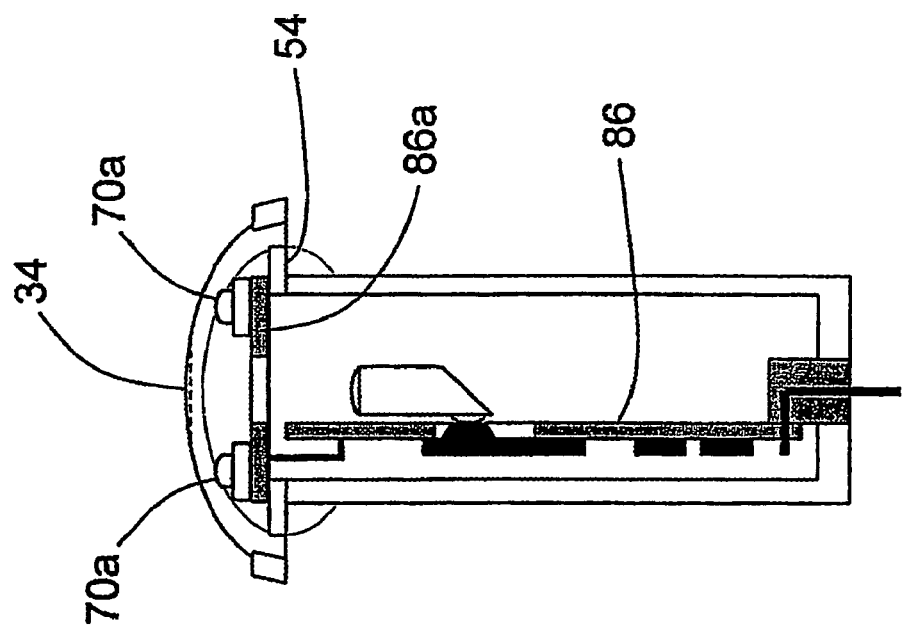
FIG. 12 is a schematic cross section of a cursor control device in which surface mount LEDs are mounted on an auxiliary printed circuit board.

FIG. 12 shows an internal construction of an alternative embodiment of a vertically oriented cursor control device in which an auxiliary printed circuit board 86a is used to mount one or more light sources 70a, here shown as surface-mount devices emitting upward. PCB 86a can be rigid, connected with wires or flex cable to main PCB 86, or PCB 86a can be a portion of a flexible circuit from which both main 86 and auxiliary 86a printed circuits are formed, and the flexible circuit could be bent into this configuration. Rigid boards are preferable for optical alignment purposes, but auxiliary board 86a could be supported on housing flange 54. Note that auxiliary board 86a requires a hole, notch, or other feature to allow the imaging optics to look through it to the sensitive area 34. Low-angle illumination of the window area can be achieved using additional optical features in the dome or simply through the geometry of the light source placement. Aesthetic considerations favoring a more symmetrical placement of visible light sources 70a spaced at a predetermined interval around a circle are at odds with a single or asymmetrically placed light sources, which provide more shadows in low-angle illumination.

Figure 13:
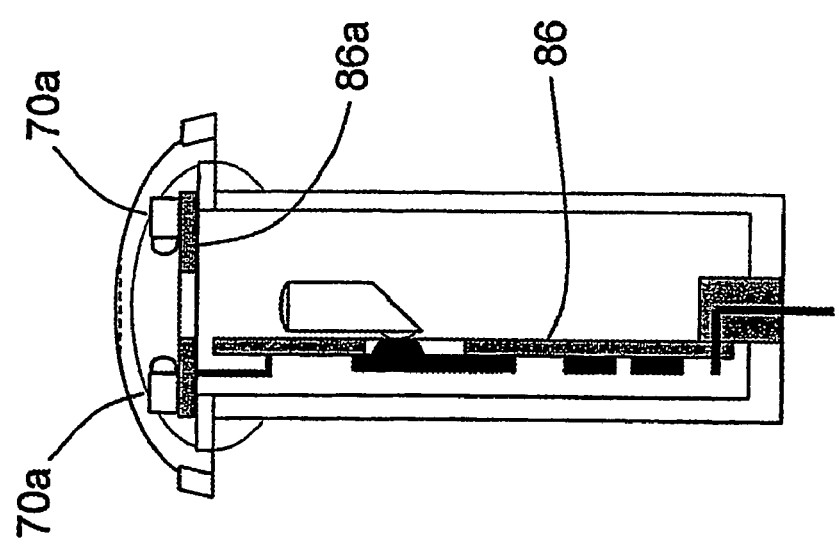
FIG. 13 is a schematic cross section of a cursor control device in which side-firing surface mount LEDs are mounted on an auxiliary printed circuit board.

FIG. 13 shows a construction of the device using an auxiliary printed circuit 86a that supports, in this case, one or more side-firing (also called right-angle) surface mount light sources 70a. This configuration has the potential of being quite compact while providing a simple way to accomplish low-angle illumination because of the light source geometry. The auxiliary PCB 86a serves in a sense as a baffle to prevent light from a light source 70a from entering the imaging optics directly.

Figure 14:
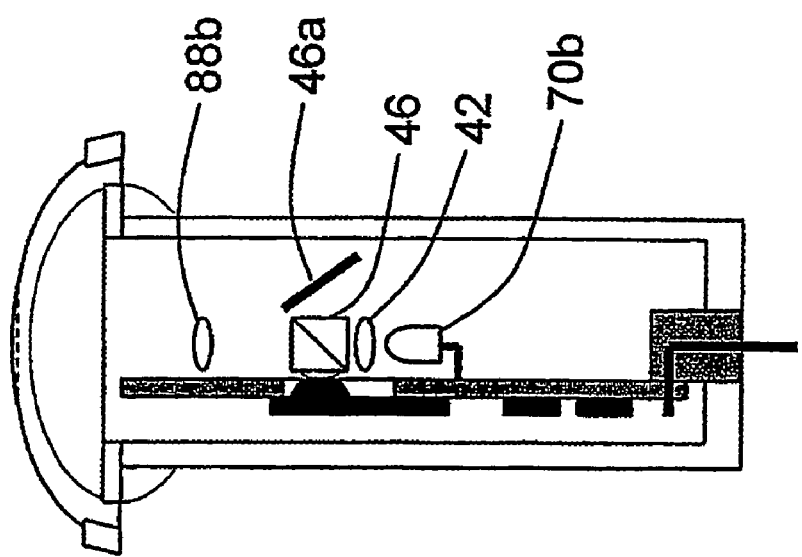
FIG. 14 is a schematic cross section of a cursor control device using coaxial illumination incorporating a beamsplitter.

In some cases, it can be desirable to provide illumination perpendicular ("normal") to the surface to be sensed, or nearly so, rather than low-angle grazing illumination. Applications in which patterned surfaces such as patterned gloves are required to be tracked, discriminating against ungloved or unpatterned surfaces, which can be single-color but textured surfaces, might require this. In this case, one way of providing near-normal illumination is to use coaxial illumination optics, in which the illumination radiation travels at least part of the way along the same path as the imaged radiation. FIG. 14 illustrates a method of providing coaxial illumination using a beamsplitter 46 to pick off image light reflected back towards light source 70b, which is preferably an LED coaxially positioned with the imaging optics. Additional condensing optics 42 are contemplated for concentrating illumination properly onto the sensitive area. In order to prevent radiation from light source 70b from bouncing off the beamsplitter 46 towards the right side of the interior of the housing, and thence back through the beamsplitter into the image sensor 80, a beam dump 46a is contemplated for absorbing radiation exiting the beamsplitter towards the right. The beam dump can be angled away from perpendicular as shown in order to reduce specular reflections from the beam dump itself, which might cause reflected light from the beam dump to enter the image sensor 80.

Figure 15:
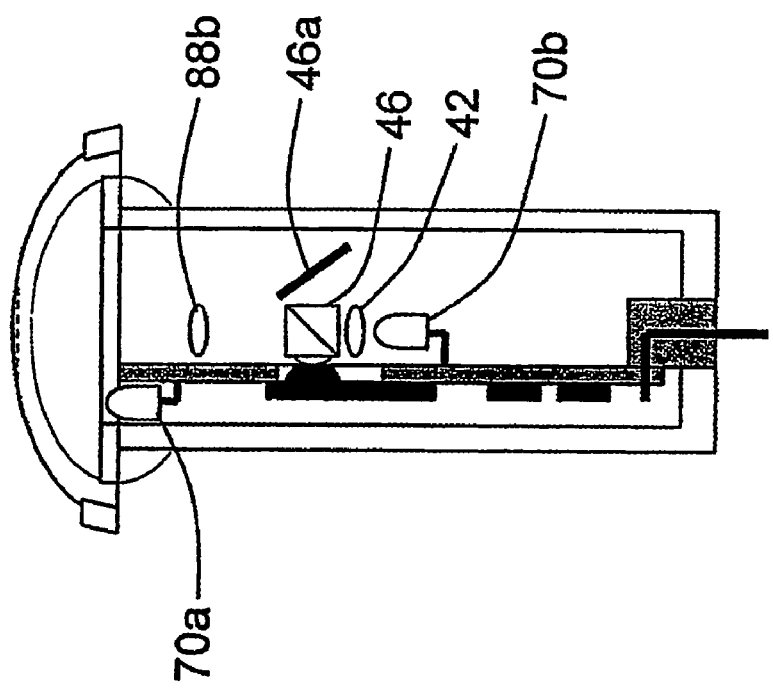
FIG. 15 is a schematic cross section of a cursor control device using both low-angle illumination and coaxial illumination incorporating a beamsplitter.

Finally, as shown in FIG. 15, a combination of both low-angle and perpendicular illumination can be implemented in a single device. Low-angle LED 70a and coaxially positioned LED 70b can be turned on simultaneously, or alternately. In the latter case, the image processing circuitry could acquire alternating frames with the two forms of illumination and keep track of motion by comparing only frames with like illumination, while merging this information to present a single motion signal to the host system.

Figure 16:
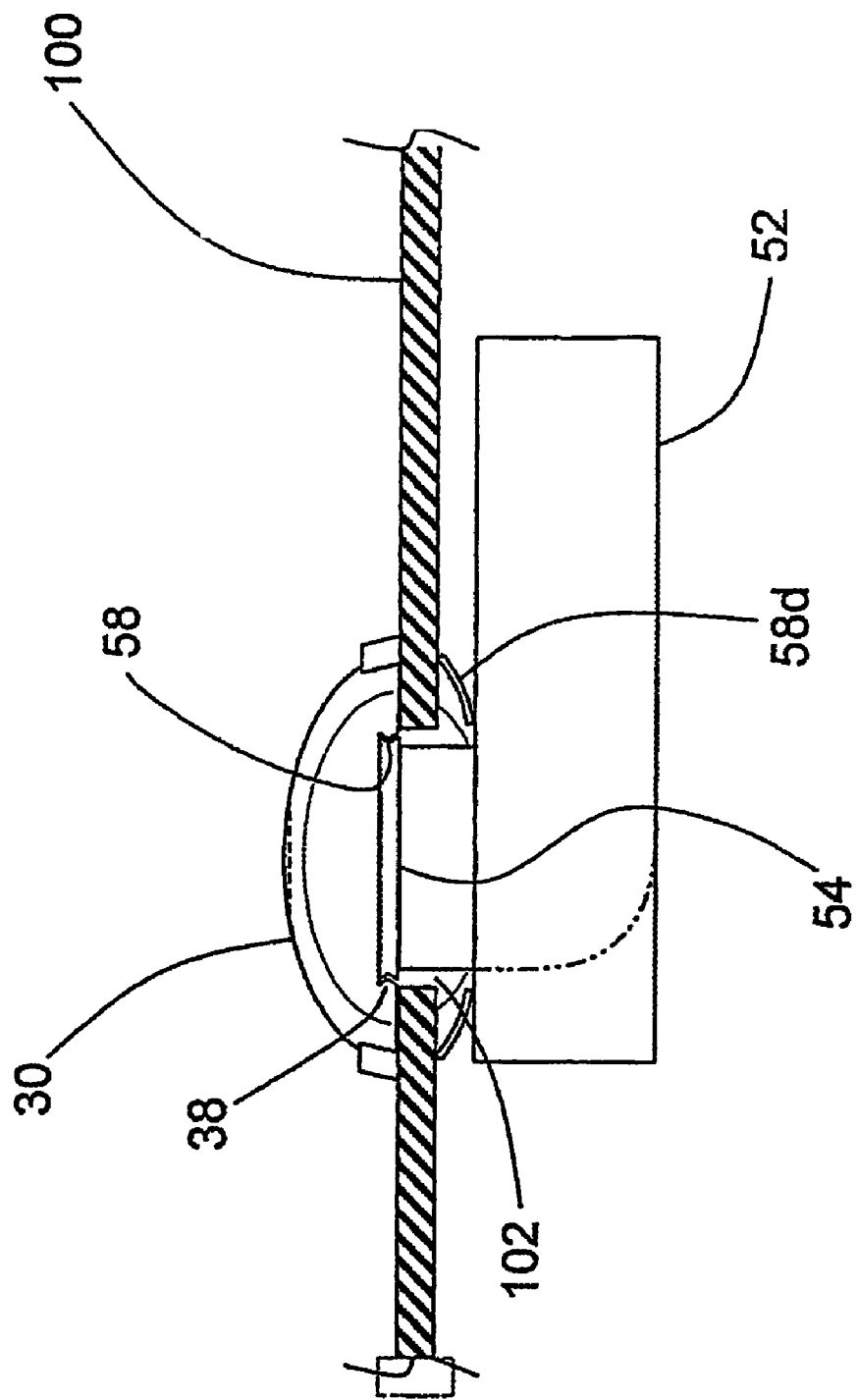
FIG. 16 is a side cross section view of a cursor control device in which the housing is mounted with its long axis substantially parallel to a plane of the panel.

In all of the preceding examples, a "vertical" orientation for the housing body was used for consistency. As mentioned before, a "horizontal" orientation is also possible. This is illustrated in FIG. 16. Such a configuration can be used to minimize thickness used behind the panel. This might be desirable in applications where the cursor control device is to be integrated into a keyboard, a laptop computer, or a thin shelf or platform. If the housing body 52 can be contoured as shown by the double-dashed line, it might be possible to insert the housing from the user side of the panel through the hole 102. Otherwise, the housing flange 54 needs to be made small enough to fit through the hole 102 from the back side of the panel. This situation is shown in FIG. 16. As shown, attachment 58 takes the form of a groove around the edge of the flange that is designed to work in concert with mating structures in the recess 38 on the back side of the dome to form a snap-together fastening. These features could be replaced by screw threads on the outer edge of the housing flange and on the inside edge of the recess. The dome and bezel are held tight against the panel through the action of spring washer 58d (or other suitable spring), drawn as a cross-section of a Belleville washer, that in compression bears against the back of the panel and the front of the housing body.

Figure 1:
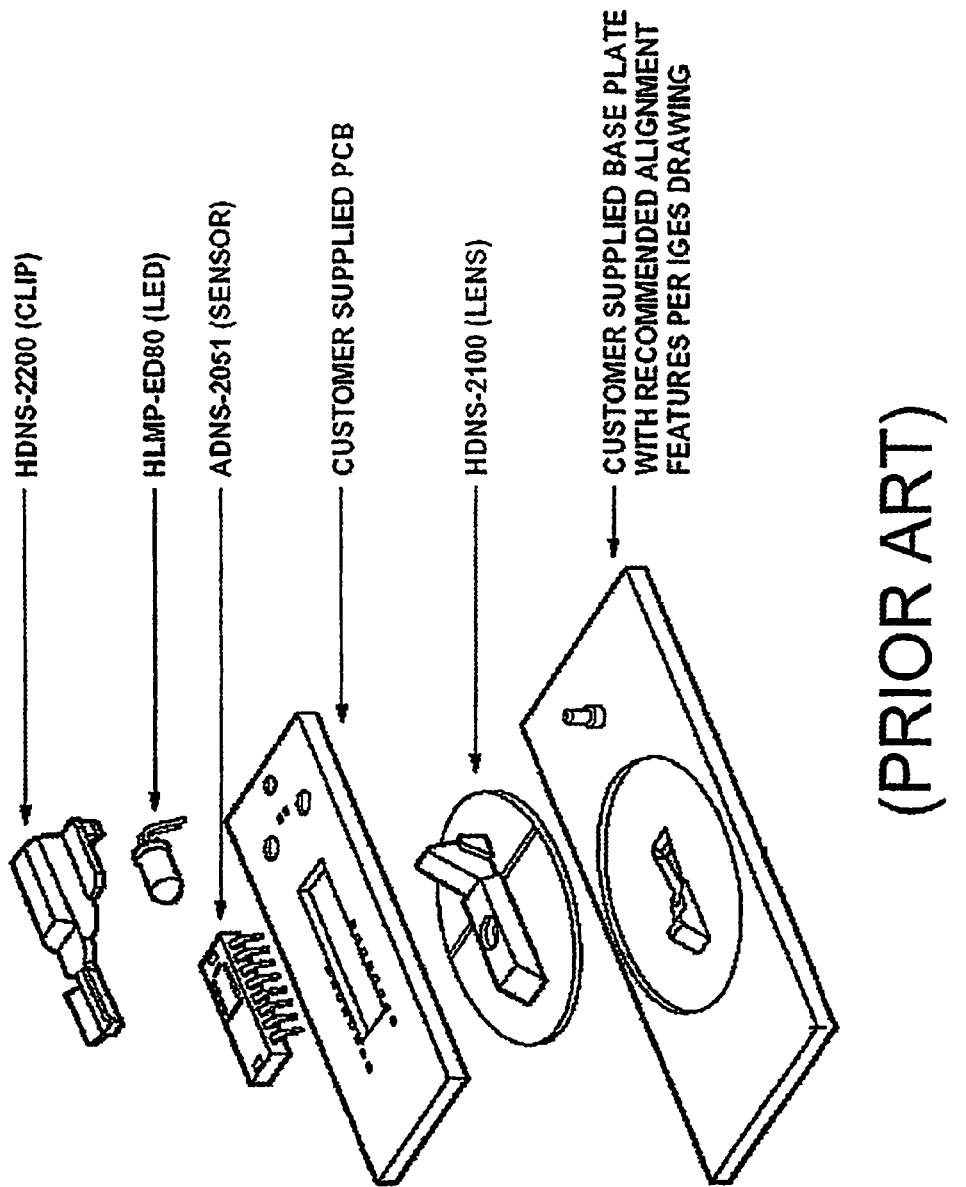
FIG. 1 is an exploded perspective view of a prior art optical mouse assembly using image sensing technology.
Figure 2:
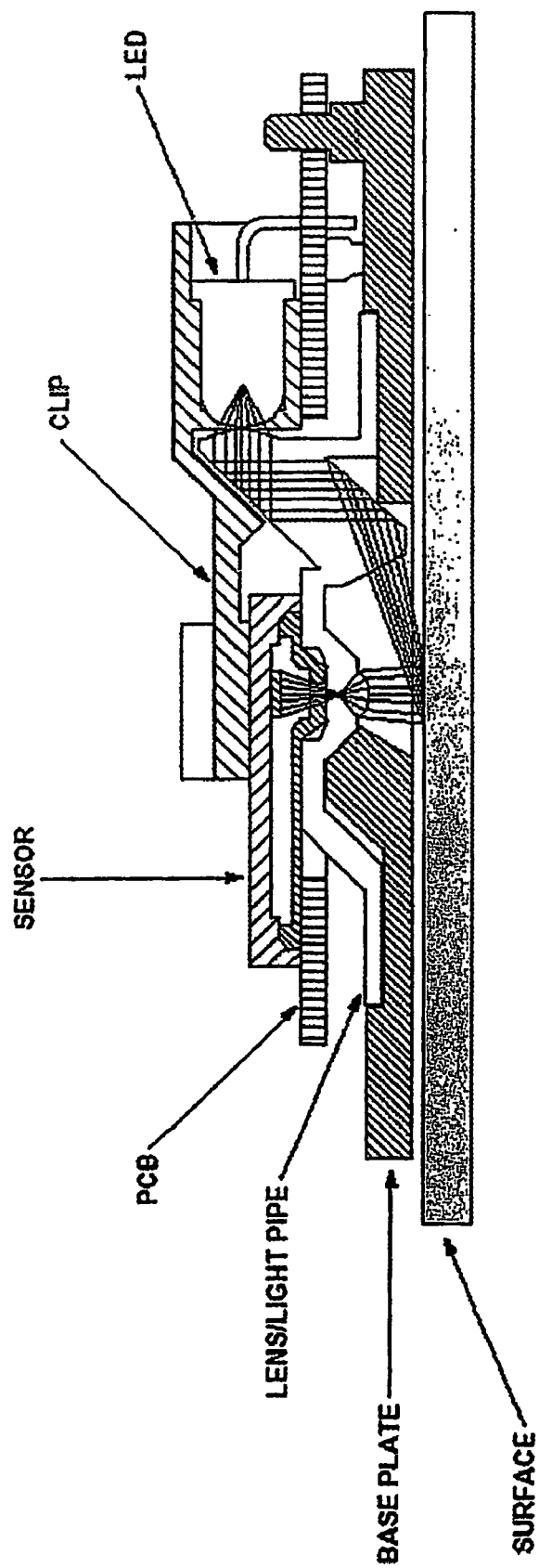
FIG. 2 is a cross-sectional view of a prior art optical mouse assembly showing paths of light rays while the mouse is in operation tracking features on a surface.
Figure 17:
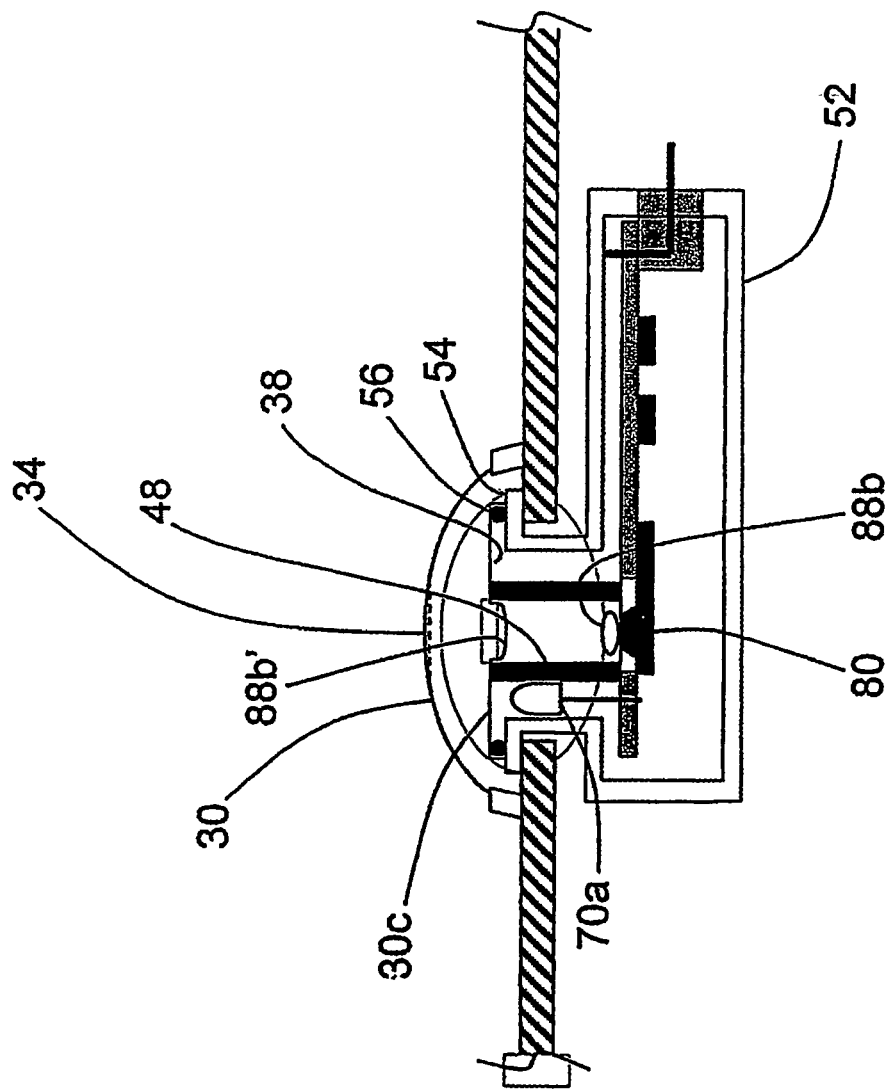
FIG. 17 is a schematic cross section view of a cursor control device similar to the one shown in FIG. 15 showing one possible arrangement of the internal parts.

FIG. 17 shows a possible internal construction for a horizontally-mounted cursor control device similar to the one of FIG. 16. Because of the orientation, an image-turning prism is not required in this version. Like the mouse of FIGS. 1 and 2, the image sensor chip and its associated imaging lens 88b can face the sensitive area directly. Light source 70a can be positioned on lengthened leads as shown to place the emitting area closer to the dome 30. Baffle 48, which can take the form of an opaque tube, shown in cross section in FIG. 17, can be required to reduce the amount of illumination reflected from the dome into the aperture of the imaging optics, and can be used to properly space the image sensor from the sensitive area 34. Features on the back surface 30c of the dome, for example, an auxiliary imaging lens 88b' formed integrally on said back surface, can be used to help position and retain the baffle 48. Also shown in this figure is an explicit means for sealing the dome 30 to the housing 52. A seal 56 of the o-ring type is shown compressed between the back surface 30c within recess 38 of the dome and against the housing flange 54.

Let us now discuss features of the dome and potential variations in more detail. As the main interface with the user for the cursor control device, the dome can have several functions. Features on and in the dome can be used as part of the illumination system and/or the imaging system in order to reduce the number of parts in the overall assembly. The dome can have various tactile and visual features to enhance the user interface.

Figure 18:
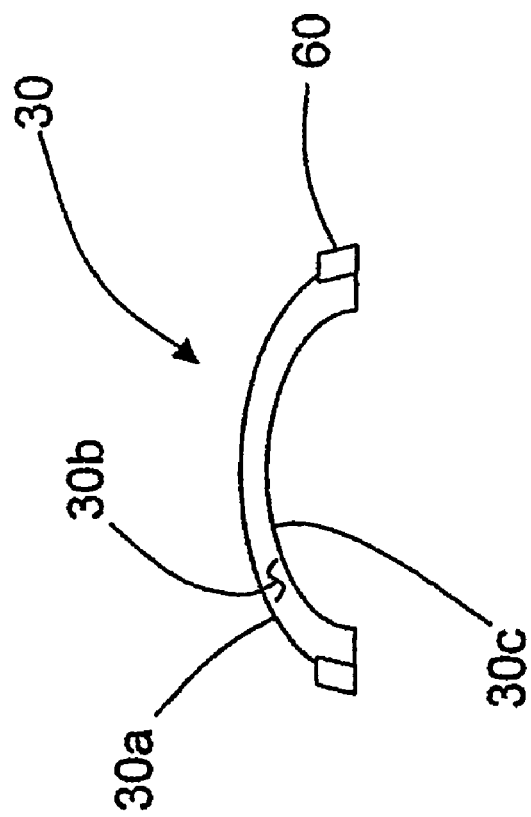
FIG. 18 shows a cross section view of a dome showing its basic parts in a side view.

FIG. 18 shows a cross sectional view of a generic dome 30 and bezel 60. Although the bezel is included in the drawings, we will not be discussing its features further. The dome 30, in addition to the lateral regions shown in FIG. 7, can in this view be described as having parts including a front surface 30a, a bulk 30b, and a back surface 30c. Various features that have useful or decorative functions can be incorporated into these parts of the dome. The generic dome shown in FIG. 18, with a smooth back surface 30c roughly parallel to a smooth front surface 30a, has no additional features that would allow it to function in any other way than as a simple dome-shaped window with mild lensing or aberrating properties.

The dome 30 is preferably made of a rigid clear material such as glass or a clear plastic. It can be tinted to reduce the susceptibility of the image sensor to react to external light sources, allowing the dome to function as an optical filter. For example, if light source 70 operates in the infrared, the bulk 30b of the dome can be tinted to make it dark or substantially absorbing in the visible spectrum while remaining substantially transparent to the illumination wavelength.

Figure 19:
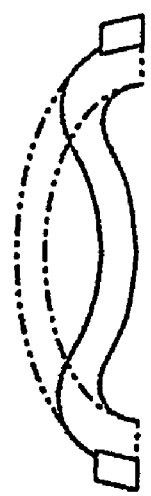
FIG. 19 shows a cross section view of a dome made of a flexible material in its deflected (solid lines) and undeflected (double-dashed lines) positions.

An alternative illustrated in FIG. 19 is to make the dome of a flexible material. Finger pressure on the center of the dome can deflect it from its natural as-formed shape, shown with double-dashed lines, to a deflected shape, shown using solid lines. This deflection would move the fingertip so as to defocus the image, which might be interpreted by the image processing circuitry as a button push, or a mechanical switch could be placed under the dome whereby this deflection could be used to actuate it.

Imaging features, for example a lens surface formed on back surface 30c, have already been mentioned in conjunction with FIG. 17. The window area can be flat instead of curved for better optical performance. Additional imaging features are discussed in a later section on limiting the depth of field.

Figure 20:
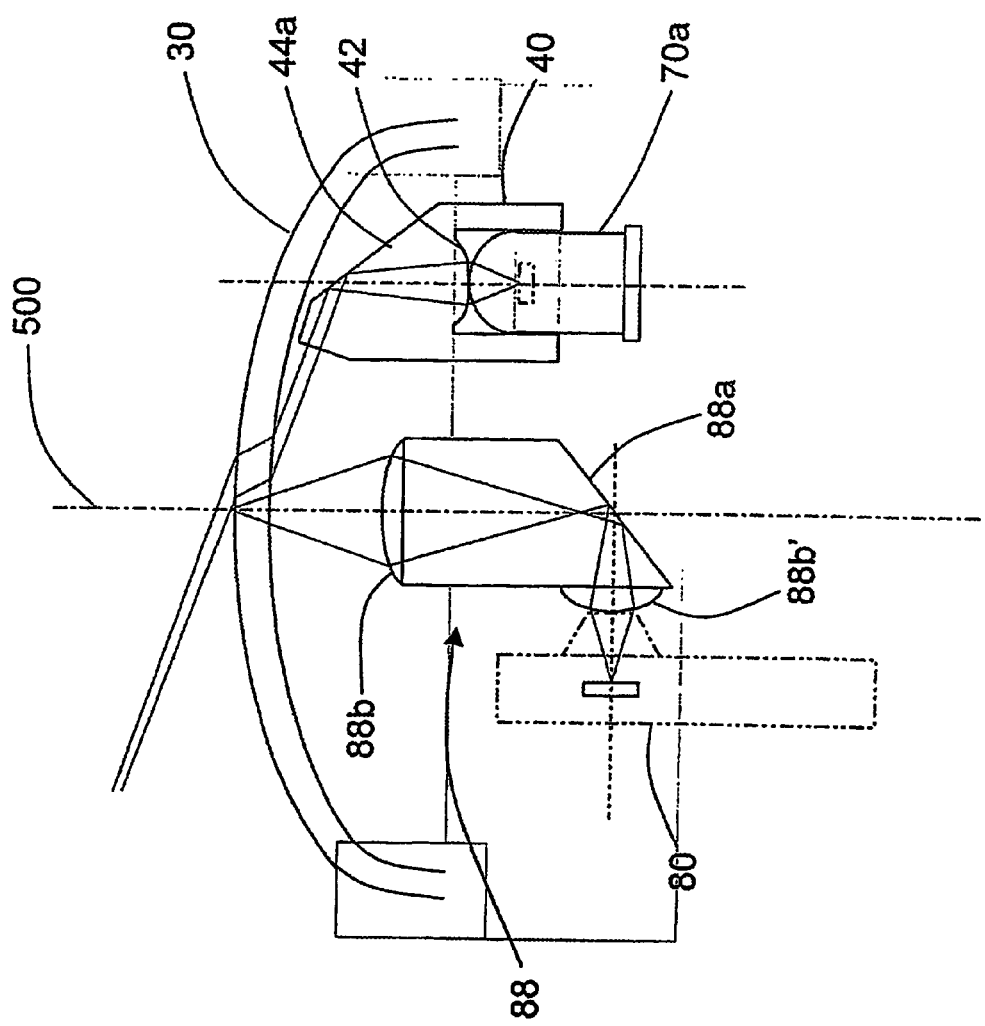
FIG. 20 is a cross sectional side view of an optical system for a cursor control device.

FIG. 20 is a cross sectional side view of a cursor control device showing an embodiment of the optical systems in more detail. In order to show the optical path clearly, this figure omits mechanical parts and features, such as a housing, and electronic features, such as circuit boards and image processors, that have been shown in other drawings. Optical rays are shown as fine lines.

In this embodiment, the illumination optics 40 include a single transparent light guide element 44a that is shaped to receive light source 70a centered on a condenser 42. A total internal reflecting (TIR) surface ("prism") turns the condensed illumination and directs it through dome 30 to illuminate the sensitive area, which is just outside the front dome surface and centered about an optical axis 500. In this embodiment, dome 30 serves only as a curved window and has no additional features forming part of the illumination optical system or the imaging optical system, although features such as a diffuser to limit the depth of field (not shown) could be incorporated easily into the surface of the dome close to the optical axis 500 without requiring alterations to this general optical schematic.

Imaging optical system 88, like the illumination system, includes a one-piece transparent element comprising a TIR surface 88a, and in this embodiment, two refracting lens surfaces 88b and 88b. A single-lens system is also possible, but the focal length would be longer than a two-lens system, and depth of field would thus be larger. More lenses or other imaging system elements could also be used, but this might result in more complicated assemblies. The two-lens system shown is analogous to a Keplerian telescope constructed of two converging lenses, but it is used like a relay system with short focal length to transfer an image with near-unity magnification (preferably a magnification in the range of 0.25 to 4). As a unity-magnification relay system, the focal lengths of lens surfaces 88b and 88b' are approximately equal, and are each operated with near unity conjugate ratio (approximately equal object and image distances). Other magnifications are feasible, as is the operation of the lenses away from unity conjugate ratio individually while still maintaining a near-unity overall system magnification. A right-angle turn in the optical system is accomplished by inserting the TIR surface (prism) 88a at 45 degrees to the optical axis 500, or an external reflection mirror could be used equivalently. One advantage of a TIR prism, however, is that it allows the entire imaging optical system to be fabricated in a single piece of material, and hence assembly is simplified, while misalignment is much less likely. Features on the imaging optics piece 88 can be designed to align to features on the image sensor package 80 to further simplify assembly and to guarantee alignment of the optical axis to the center of the image sensor. Additional mechanical features (not shown) on the housing, dome, or separate pieces can be used to hold the optical elements in proper registration with one another and with the light source 70a and image sensor 80.

Although illumination system 40 is shown in this drawing placed diametrically opposed around axis 500 from image sensor 80, the illumination optics and the direction of illumination can be placed at any angle around centerline 500 without affecting operation of the cursor control device. This is because regardless of the direction shadows are cast, the image sensor is capable of tracking their motion. This rotational degree of freedom in the design of the illumination optics can be used to aid in assembly, interconnection, or miniaturization. Multiple copies of the illumination optics can be disposed in one or more pieces at certain uniform or nonuniform angular intervals around axis 500 for redundancy, for aesthetic appeal when seen from outside the dome, or even used alternately to optimize the illumination. See the discussion of FIG. 15 regarding how multiple illumination sources could be used together. In the case where multiple illumination sources are disposed around the axis 500, diversity in this rotational axis angle could result, as opposed to the diversity in low versus high angle illumination that is achieved using the arrangement of FIG. 15. This can be useful if there is a direction to a texture that needs to be tracked such that better shadows are obtained from one axial rotational angle versus another.

Figure 21:
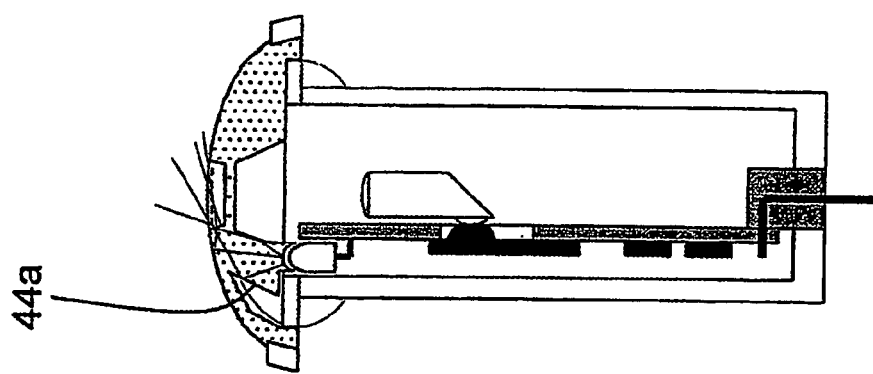
FIG. 21 shows a schematic cross section view of a cursor control device having a light pipe for illumination integrally formed into the material of the dome.

Because of the overall geometry of the device, it can be useful to incorporate features of the illumination optics into the dome. This is particularly important to redirect the light from the light source and to successfully couple it out of the window without total internal reflection. Features such as prisms, or a light guide 44a can either be a separate piece as shown in FIG. 20, or made part of the dome construction as shown in FIG. 21. Total internal reflection occurs where desired within the dome to redirect the illumination between surfaces of the dome material and air contained inside the housing. A recessed window area can be used as shown in FIG. 21 to allow illumination light to exit the integral light pipe at a low angle to the sensitive area without total internal reflection.

Examples of variations in dome construction that incorporate elements of the illumination optical system will now be described with reference to FIGS. 22A and 22B.

Figure 22A:
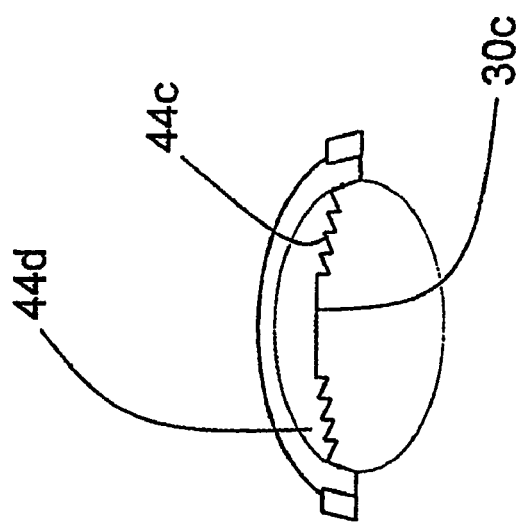
FIG. 22A shows a cross section of a dome having microprisms or Fresnel lens rings formed into the back surface of the dome.

FIG. 22A shows microprisms 44d or rings of a Fresnel lens 44c formed into the back surface 30c of the dome. These can be rotationally symmetric about the window area. In this case the rotational orientation in which the dome is assembled to the housing is unimportant, which can simplify the manufacture of the device. Alternatively, more sophisticated microreplicated optical features without said rotational symmetry can be formed to perform concentration of the illumination from a single light source more efficiently.

Figure 22B:
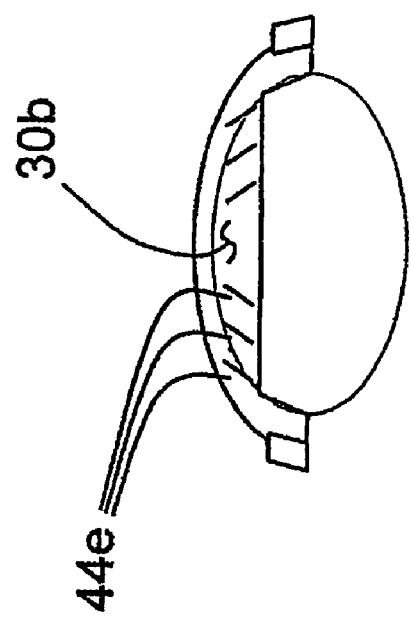
FIG. 22B shows a cross section of a dome having reflective louvers formed into the bulk of the dome.

FIG. 22B shows reflective louvers 44e formed into the bulk 30b of the dome to redirect and/or focus the illumination. These can be formed, for example, by a first molding operation, a metalization operation, and a second molding operation to embed the louvers. The second molding operation can be eliminated, in which case the back surface of the dome would follow the louver contours. Alternatively, grooves or air pockets can be formed to cause total internal reflecting louvers instead of reflectively coated louvers.

Aesthetic features can readily be incorporated into the outer ring of the dome. Tactile and/or visual features highlighting the window or sensitive area can be included, such as a raised ring around the window, a raised or recessed window area, or a difference in texture between the window and the outer ring. With the proper illumination and texture, an overall glowing appearance could be given to the outer ring. Additional aesthetic variations are discussed in further detail below.

Coatings having wear-resistant and/or antireflective properties can be applied to the front surface of the dome. Antireflective coatings can be applied to the back surface. Reflective (e.g. metallic) coatings can be used to enhance illumination or create a shiny appearance to the outer ring area.

As discussed earlier in connection with FIG. 5, it is desirable to make the cursor control device sensitive only to surfaces that are in close proximity (for example, less than 3 mm) to the front surface of the dome. The object plane, or plane of optimum focus can be placed at the front surface of the dome, or slightly out toward the user to enlarge the depth of field somewhat. Image processing circuitry 82 can be designed to stop updating cursor position or motion information when insufficient image features are being sensed by the image sensor 80. The commercially available sensor chips from Agilent Technologies implement this function. Image features can be "lost" due to several factors. A defocused image will lack sharp features to track. Moving to an extremely smooth, uniformly colored surface lacking contrasting features or height differences to cast shadows can prevent updating of the cursor position. Therefore, either the imaging optics (depth of focus) or the illumination geometry (lighted volume) can be used to limit the depth of field. Depth of focus on the imaging optics can be reduced by using large aperture, short focal length lenses (high numerical aperture) in the system. Concentrating the illumination in the region close to the front surface of the dome reduces sensitivity away from the dome. The use of fiber optic faceplates is discussed in further detail below.

A technique for implementing reduced depth of field is to incorporate a diffuser into the system, preferably through structures or texture (referring again to FIG. 18) on the front surface 30a of the dome, although a diffuser could also be incorporated into the bulk 30b or back surface 30c or any combination. Objects in contact with a diffuser that induces random phase variations such as rippled glass can be seen more clearly than those spaced behind it. This is because light rays that emanate from, or are reflected from, the object are redirected and shifted by the diffuser, and the amount of the effect is larger for rays that travel a larger distance between the object and the diffuser. Diffusing structures can be a random texture, which can be of different depths or feature size. Referring now to FIG. 7, diffusing structures can be placed in the outer ring 36, window area 32, and even within the sensitive area 34 on the window. Diffusing structures in the outer ring 36 or window 32 can be used to enhance illumination through control or alteration of total internal reflection conditions. Imaging properties are most affected by diffusing structures within sensitive area 34. Instead of random texture, more sophisticated optical structures such as microprisms could be used to perform these illumination or diffusing functions. Microprisms for directing or diffusing light are commonly reproduced by embossing or molding processes known as "microreplication" for products such as liquid crystal display backlights, projection display screens, lighting products, and focusing screens for camera viewfinders. The same techniques can be used to make Fresnel lenses with the capability of focusing light. Similar processes could be used in the fabrication of a dome for a cursor control device.

It can be seen that the cursor control device described above can be constructed of low-cost, common materials in a variety of ways, for example using standard injection molding techniques for the housing and dome, and fastened together using any of a number of standard techniques singly or in combination, including snapping or screwing together, gluing or fusion bonding.

Many alternative embodiments of the cursor control device have already been described in the preceding description. There are still more variations that can be implemented in the context of more elaborate systems with more features, or to enable different applications in which the primary object is not ruggedness.

Figure 23A:
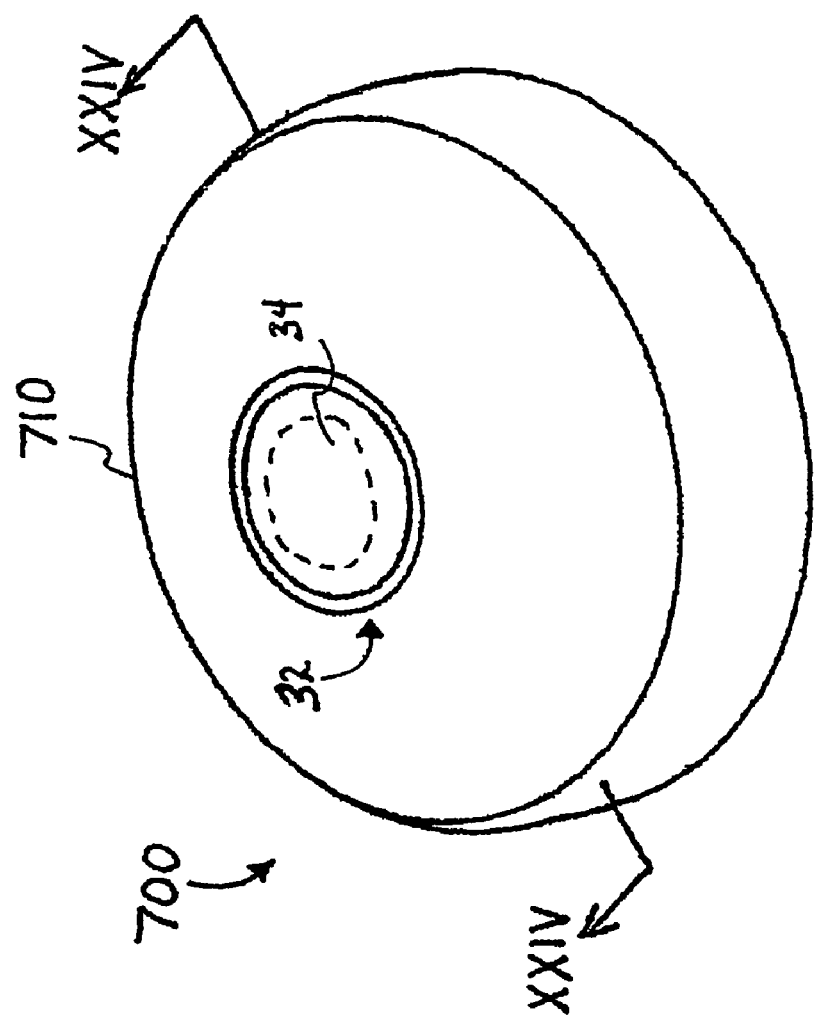
FIG. 23A shows a perspective view of an embodiment of a cursor control device according to the present invention.
Figure 23B:
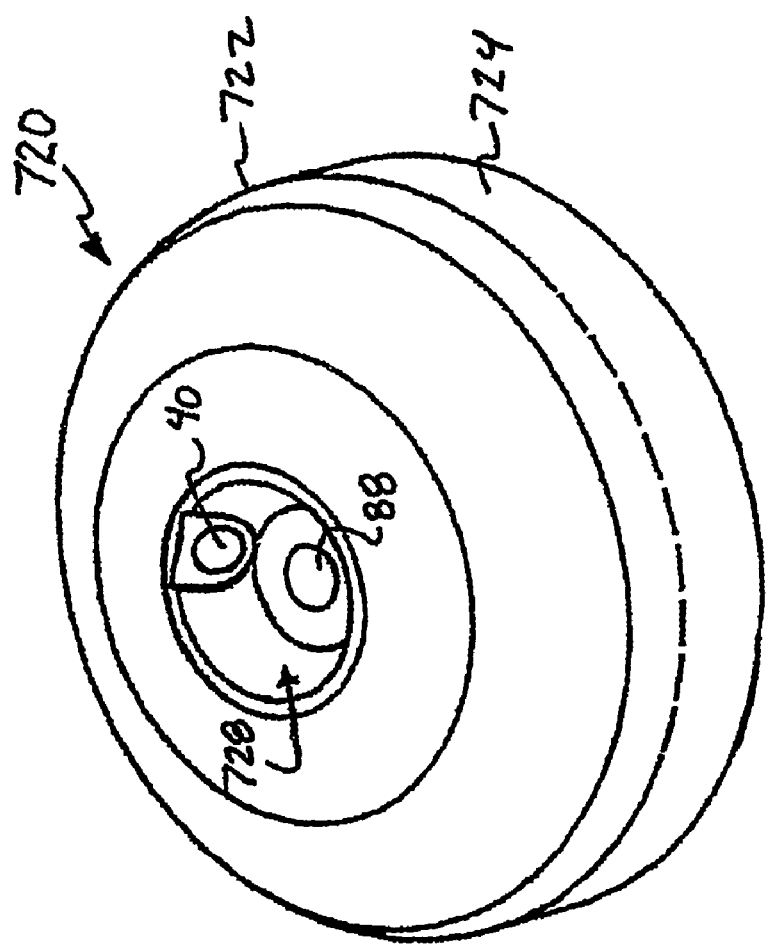
FIG. 23B shows a perspective view of an inner housing of the cursor control device shown in FIG. 23A.
Figure 24:
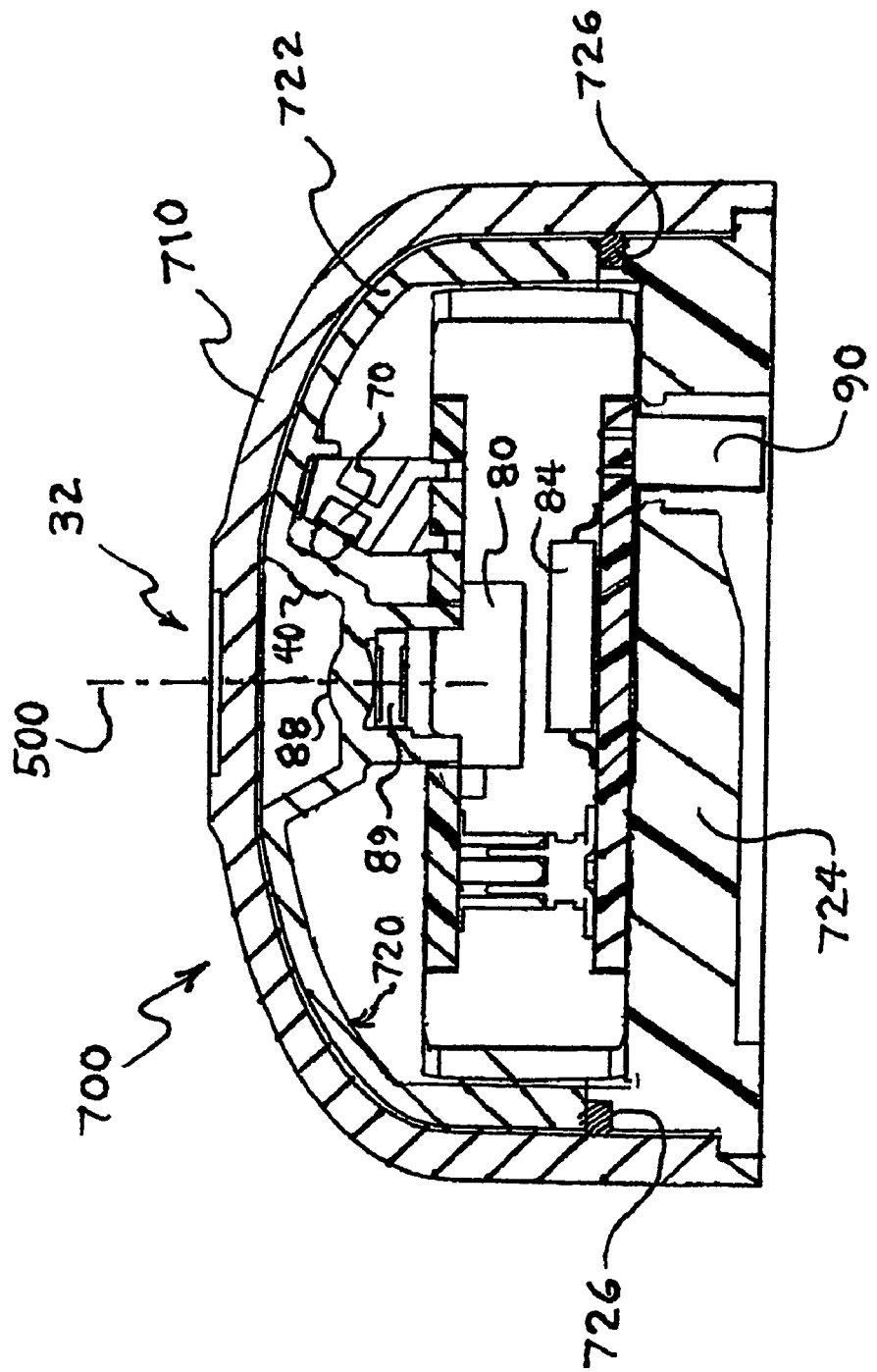
FIG. 24 shows a cross-sectional view of the cursor control device shown in FIG. 23A taken along sectional lines XXIV-XXIV.

One example of an alternative embodiment is a dome-within-a-dome structure as shown in FIGS. 23A, 23B, and 24. FIG. 23A shows a perspective view of a cursor control device 700, FIG. 23B shows a perspective view of an inner housing 720 of the cursor control device 700, and FIG. 24 shows a cross-sectional view of the cursor control device 700 taken along section lines XXIV-XXIV of FIG. 23A. The cursor control device 700 includes an outer shell 710 (or outer dome) and an inner housing 720 (or inner dome) nested in the outer shell 710. A preferred diameter of the outer shell is in a range from 10 mm to 80 mm, more preferably from 25 mm to 60 mm. These preferred dimensions produce a device that resembles a conventional trackball in both size and shape. Due to the compactness of the assembly, the entire functioning of the device, including sensing, processing, and interface to a host computer, can be performed within the envelope of just the "ball" part of a conventional trackball unit. The outer shell 710 is generally provided in the form of a convex dome, and the inner housing 720 includes a complementary convex dome portion 722 nested in the convex dome of the outer shell 710. The outer shell 710 has a window 32 through which illumination and imaging are performed. The window 32 also provides a user with a visual indication of a sensitive area 34 (outlined with a broken line) of the outer shell. It should be noted that the sensitive area 34 outlined in FIG. 23A is shown for explanatory purposes and is not intended to be limiting, especially with regard to size and shape of the sensitive area 34. The inner housing 720 has a somewhat centrally located depression 728 that aligns with the sensitive area 34 of the outer shell 710 when properly assembled. The depression 728 has an upper opening that is at least as big as an expanse of the sensitive area 34. In the present embodiment, as can be appreciated by the view shown in FIG. 24, the upper opening of the depression 728 is aligned with the perimeter of the window 32.

The inner housing 720, in addition to having the convex dome portion 722, also includes a base 724 and a seal 726 disposed between the base 724 and the convex dome portion 722. The seal 726 in combination with the convex dome portion 722 and the base 724 provides for the inner housing 720 being fluidly sealed from the environment.

Disposed within the inner housing 720 is the optical engine for converting motion proximate to the sensitive area 34 of the outer shell 710 into cursor control data. The optical engine includes components previously discussed, such as a light source 70, a sensor 80, and an image processor 82. Integrated into the inner housing is imaging optics 88, which serves as an imaging lens, and illumination optics 40, which serves as an illumination lens. The illumination optics 40 can be formed to perform a function analogous to the condenser lens 42 discussed above, or, optionally, can be simply a window lacking optical power. Disposed between the sensor 80 and the imaging optics 88 is a filter element 89, which will be discussed in greater detail below.

In the present embodiment, the outer shell 710 can be designed to be readily removable from the inner housing 720. Since the inner housing 720 is independently sealed, the outer shell 710 can be removed and/or replaced from the inner housing 720 without compromising the sealing of the inner housing 720.

Since the cursor control device 700 (as well as other embodiments) is designed to look upward into ambient background lighting, several techniques can be used to reject unintended background signals. In the following paragraphs, imaging and illumination conditions are described with reference to FIG. 25.

Figure 25:
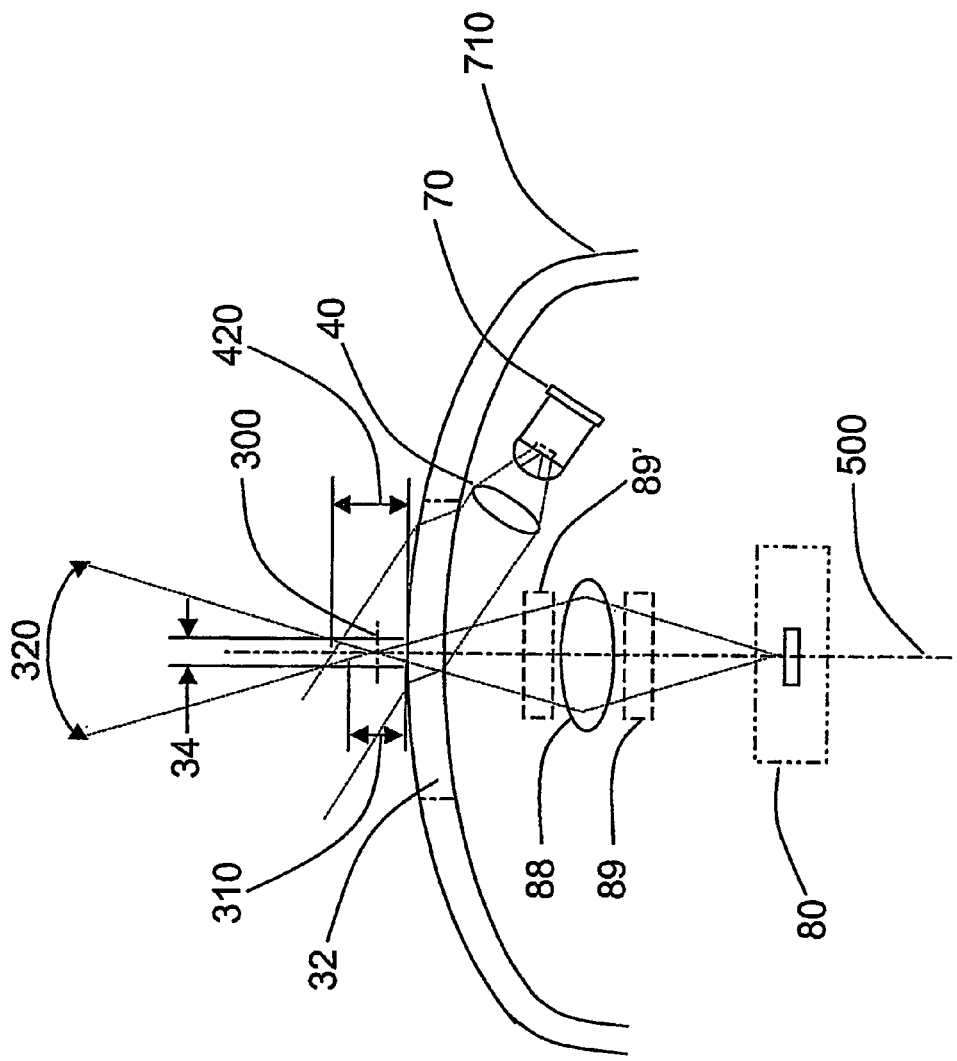
FIG. 25 shows a block diagram of a cursor control device according to the present invention.

FIG. 25 shows a schematic diagram of the cursor control device 700, wherein certain components such as the inner housing 720 have been omitted for clarification purposes. It will also be appreciated that the discussion related to FIG. 25 can apply equally to other embodiments of the present invention.

In FIG. 25, an object plane 300 (i.e., plane of best focus) is preferably placed outside of the outer surface of the window 32 by approximately half the depth of focus 310 of the imaging system to maximize the depth over which uneven objects can be sensed and tracked. The "near" edge (to the sensor) of the depth of focus 310 should be placed at or near the outer surface of the window or slightly inside the window to allow for focal length errors or axial alignment errors without causing a gap in sensing at the outer surface of the outer shell 710. The sensing volume is further defined by the illuminated region 420, that is, the depth along the imaging optical axis 500 over which the illumination from the light source 70 extends, as well as its lateral extent.

Together the depth of focus 310 and illuminated region 420 define a total depth of field. A desirable depth of field is a few millimeters (more than 1 and less than 5) for sensing a human hand in contact or near-contact with the outer surface of the window 32. This allows tracking in the presence of normal topography and occasional loss of perfect contact with the window 32. The lateral field of view of the sensor together with imaging optics 88 determine the lateral sensitive area 34 within the depth of field. In addition, the sensor has an angular field of view 320 within which far-away objects or light sources may be sensed, leading to possible spurious motion data that must be rejected. Illumination optics 40 (such as a condenser 42 or the like) is preferably provided to optimize the concentration of the illumination light from the light source 70, as well as its collimation. The more concentrated the illumination is, the higher the potential signal reaching the sensor 80, but the smaller the illuminated volume, so there is an optimum. Likewise, for a given light source 70, which is typically not a point source, but of finite extent, there is an optimum focal length and distance from the light source at which the light rays from the source at the object are most parallel, resulting in the most crisp shadows in grazing incidence illumination (see discussion below). The generation of crisp shadows also favors the use of a single illumination source from a single direction. The choice of focal length and position for condenser 42 The choice of focal length for condenser 42 is a compromise between all these factors. Finally, background rejection is maximized by high concentration of the illumination (small illuminated depth 410), and a narrow angular field of view 320.

A second method of background rejection involves a choice of illumination wavelength and the use of optical filters which can reject light at wavelengths other than the illumination wavelength. In some embodiments, the light source 70 is an infrared LED with a center wavelength in the range of 780-1000 nm, typically 875 nm. Optical filters are readily available in materials that block most light at visible light, appearing nearly black to the human eye, but pass the great majority of the infrared illumination light. The entire outer shell 710 or just the window 32 can be made of such a filter material. Alternatively, a filter or filters may be placed as indicated by 89 and 89' in FIG. 25 with the same or different wavelength-blocking characteristics. A single additional filter could be placed in either position 89 or 89', or filters could be provided in both positions 89 and 89'. In position 89, the filter would be disposed as shown in FIG. 24 between the imaging optics 88 and the sensor 80. In position 89', the filter would be disposed in the depression 728, between the window 32 and the imaging optics 88. For example, the outer shell 710 and window 32 could be made of a material that passes infrared light and visible light, and filter 89 could be made of a material that blocks visible light and ultraviolet light. If the sensor 80 is sensitive at unwanted wavelengths such as longer infrared wavelengths, those wavelengths could be blocked using a short-pass filter.

Polarization techniques could also be used to reject half of unpolarized ambient light. Light from the light source 70 could be preferentially polarized, either internal or external to the source, for example by building polarizing filters or properties into the illumination system. The optical filters 89 and 89' could have polarizing properties built into them so they could act as analyzers, rejecting light that is not polarized the same as that from the illumination light source as reflected by the sensed object.

Software or firmware algorithms in the image processor 82, interface circuitry (e.g., controller 84 in FIG. 3), or drivers in the host computer (item 800 in FIG. 33) can additionally be implemented to perform rejection of background light or features. It has been found that when there is no object in the illuminated region 420 (see FIG. 25), or even when the object is leaving the plane of best focus 300 while still fully illuminated, the amount of light reaching the sensor 80 is reduced significantly. This is even more effective when filter or filters 89, 89' are used to reject wavelengths other than the illumination wavelength from the light source 70. An additional light sensor could be used to generate a signal indicating the presence or absence of an object to be tracked within the illuminated region. However, suitable sensors for use in this device often have an electronic shutter (integration time per frame) or automatic gain control (AGC) whose setting is related to the light level reaching the sensor 80, and which can be read by the image processor 82. In the case of an electronic shutter, the "open time" shutter value increases as the light level drops due to the removal of an object from the sensing volume. Thus the shutter value may be used as an indicator of tracking effectiveness (hereafter referred to as "tracking indicator"). Whenever the shutter value exceeds a certain threshold, sensed motion can be ignored. When used with adaptive illumination (described later), the proper tracking indicator must take into account the intensity setting of the light source 70, since the amount of light hitting the sensor 80 in each frame is proportional to the light source intensity times the shutter "open" integration time. This tracking indicator can be an "illumination indicator" instead of a "shutter value." Such an illumination indicator can be represented by $L=kf(B)S$, where L is the illumination indicator inversely proportional to the amount of light hitting the sensor, k is a proportionality constant, f(B) is a function of the light source command value B that comprehends a possible nonlinear relationship between the command value and the actual intensity emitted by the light source 70, and S is the shutter value which is proportional to electronic shutter integration time. It should be noted that other devices such as capacitive sensors could be used to generate a tracking indicator based on the proximity of an object to be tracked, and thus this algorithm is not limited to using illumination information as a tracking indicator. In fact, if other hardware, software, or firmware means are available for generating a tracking indicator, perhaps based not on proximity, but for example, based on an analysis of the motion data, then this alternative tracking indicator could be used as well as an input to the algorithms for background rejection and path projection to be described herein.

Figure 26:
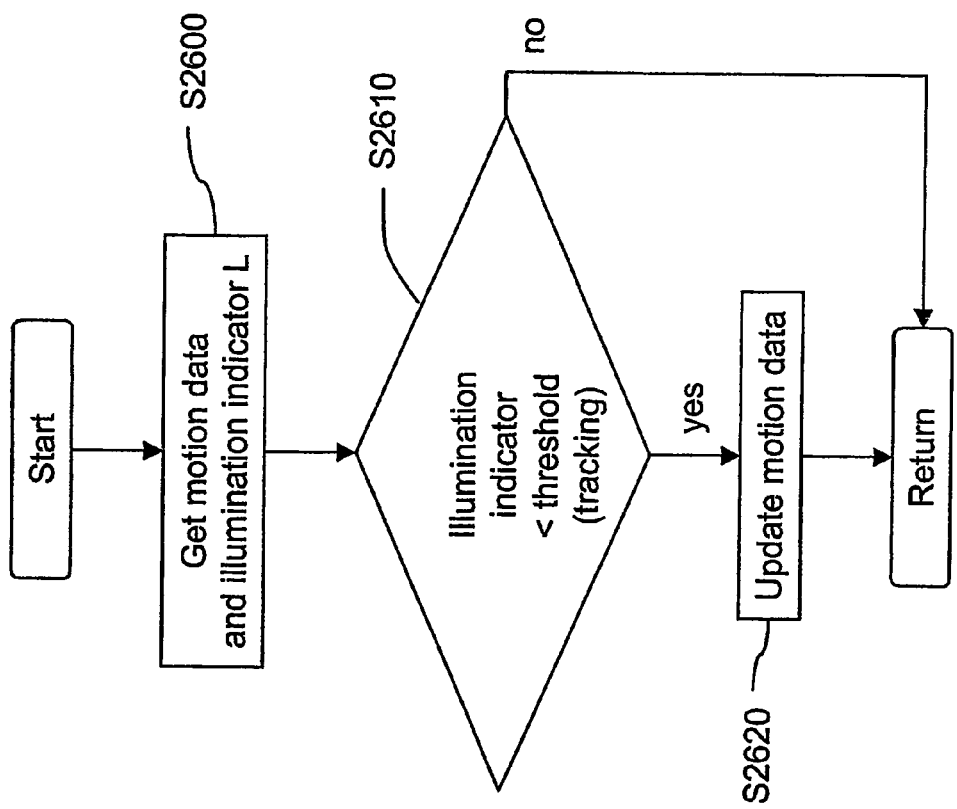
FIG. 26 shows a flowchart illustrating an example of an algorithm for ignoring motion when the illumination indicator is high.

A flowchart describing an example of an algorithm for ignoring motion when the illumination indicator is high is shown in FIG. 26. This algorithm is useful in rejecting false motion data generated, for example, by the presence of relatively low-level ambient background light and/or by moving shadows cast from the environment surrounding the optical engine. However, it should be noted that this processing is not limited to being performed by an image processor such as image processor 82, but can be performed all or in part by a separate device, such as controller 84, which includes a controller/processor for further processing motion data. In one embodiment, the image processor 82 can be used only for the portions of the process related to processing the image to produce motion data and illumination indicator data. However, image processing is not required. At step S2600, the image processor 82 receives motion data and an illumination indicator L from the sensor 80, or, alternately, the image processor 82 receives data such as the shutter value from the sensor and the image processor 82 calculates an illumination indicator L as described above. At step S2610, the image processor 82 compares the illumination indicator L to a threshold value, above which it can be construed that no tracking is occurring. If the illumination indicator L is less than the threshold value ("yes" at step 2610), then the process continues to step S2620 where motion data is updated. Otherwise, if the illumination indicator is greater than the threshold value ("no" at step 2610), then step S2620 is bypassed. Thus, according to the process illustrated in FIG. 26, unless a suitable amount of illumination is detected by the sensor 80, motion data is not updated.

Figure 27A:
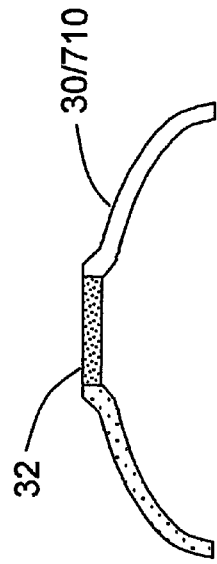
FIGS. 27A-27E show various arrangements of a scratch-resistant dome for the present cursor control device.

In order to provide reliable tracking after a long term of use in which hands, gloves, or other objects are repeatedly slid across the outer shell 710 or dome 30 as the case may be, it is desirable to provide for protection of the window 32 to make it resistant to scratching and other damage. FIGS. 27A-E show a number of embodiments of a scratch-resistant outer shell 710 or dome 30. It is preferable that the window 32 (or at least the lateral sensitive area 34 associated with imaging), through which illumination and imaging light passes, be of a high optical quality. FIG. 27A represents a dome 30 or outer shell 710, having an optical window area 32, that is made of one piece of scratch-resistant material such as glass or sapphire. Certain polymer materials are sufficiently scratch resistant to be used "as-is." In these figures, the window 32 is shown as flat on both sides, although other shapes are contemplated. The window 32 is preferably raised slightly above the base curvature of the dome 30/outer shell 710 to provide a tactile element 30d to provide the user with a feel for the location of the active area.

Figure 27C:
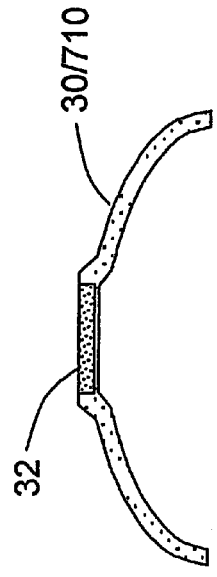
Figure 27D:
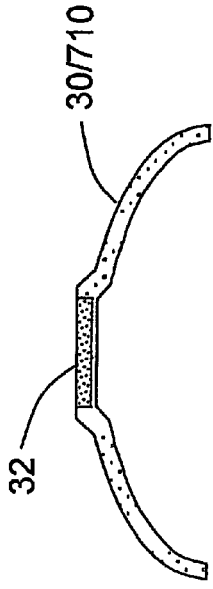
Figure 27B:
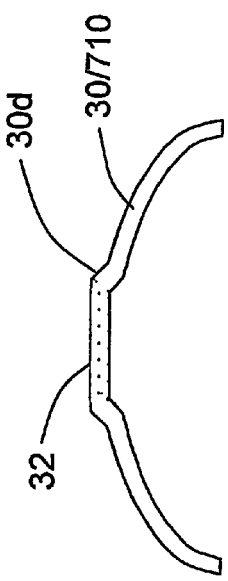

In FIG. 27B, a thin (compared to the thickness of the surrounding material) scratch-resistant layer or coating 340 is applied to the entire outer surface of the dome 30/outer shell 710. Such a coating may be limited during application to covering just the outer surface of the window 32 or even just the sensitive area 34. For simplicity, however, it may be desirable to apply it as shown to the entire outer surface of the dome 30/outer shell 710.

FIG. 27C shows an optical window 32 made of a separate piece of scratch-resistant material inset into a through-hole in the dome 30/outer shell 710. As mentioned earlier in the discussion of FIG. 25, the window 32 can have optical filtering properties that are different from those of the dome 30/outer shell 710 or filters 89 or 89'. The window 32 can be molded in place, pressed, welded, glued, or otherwise affixed into the hole in the dome 30/outer shell 710.

A more secure means of supporting the window 32 is to provide a ledge as shown in FIG. 27D to prevent it from slipping axially within the hole. Note that in a dome-within-a-dome structure as described earlier, it is not essential that the window 32 be sealed perfectly to the outer shell 710, although it may be desirable to help keep the region between the outer shell 710 and the inner housing 720 clean and dry.

Figure 27E:
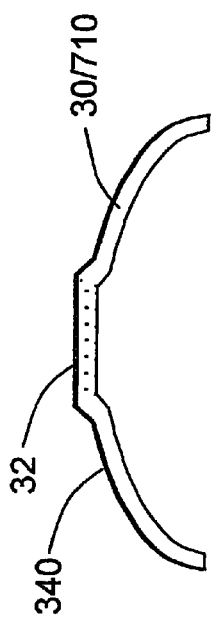

Another alternative is shown in FIG. 27E, where the material for constructing the dome 30/outer shell 710 remains continuous under the window 32 by forming a recess instead of a through-hole. This preserves the sealing of the dome 30/outer shell 710 and helps to support the window 32. In this case, an optical quality adhesive that is transparent to the illumination wavelength is preferably used to hold the window 32 into the recess.

In all three cases (FIGS. 27C, 27D and 27E) that use a separate window piece, it is desirable to set the outer surface of the window 32 flush with the outer surface of the dome 30/outer shell 710 or raised part of the dome 30/outer shell 710 as shown. This ensures that there is no sharp edge that the user can feel, that can get chipped, or that can collect contaminants such as grease or dirt. Additional pieces or structures (not shown) such as bezels or screw caps may be used to retain the window 32. These additional pieces may have decorative functions or may act as part of the tactile element 30d.

Figure 28:
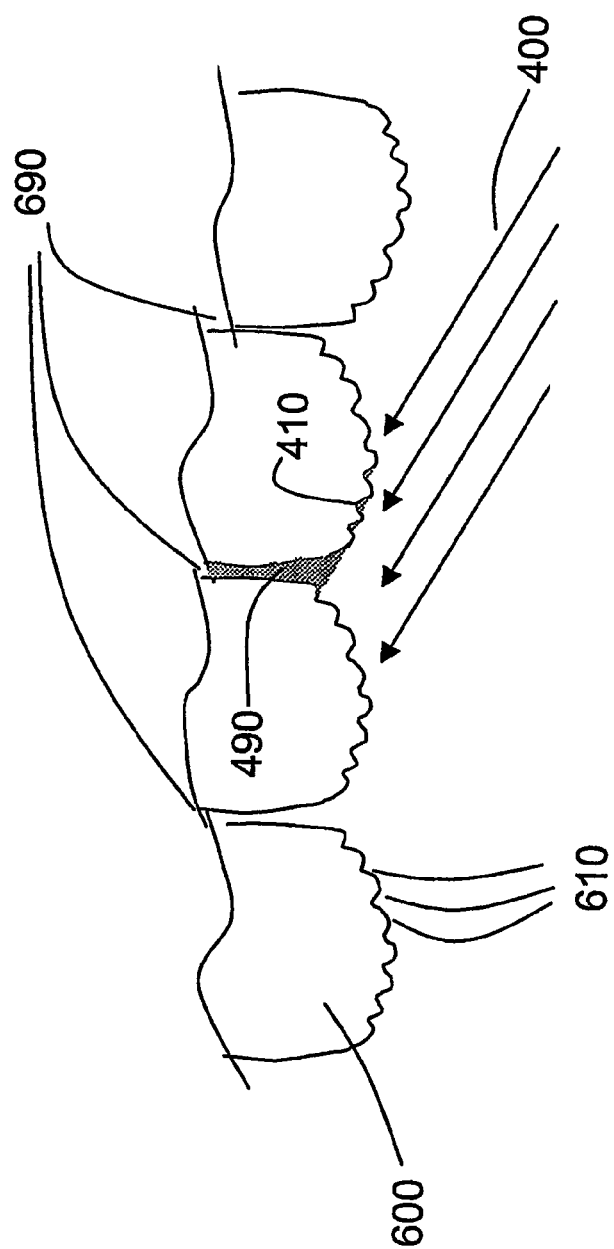
FIG. 28 shows an enlarged schematic view of the palm side of human fingers held close together as they would normally be while operating the present cursor control device.

A human hand or a glove has characteristics that must be accommodated in order to be tracked reliably and provide a satisfying user experience. Hands or gloves are usually relatively light and uniform in color, resulting in relatively few light-to-dark transition features to be tracked. Therefore, it is most effective to track surface roughness features using grazing incidence illumination. FIG. 28 shows an enlarged schematic view of the palm side of human fingers 600 held close together as they would normally be while operating the present cursor control device. Illumination light 400 is incident at an angle more parallel to the surface than perpendicular. There are essentially two scales of surface topography, the small scale (in depth and lateral dimensions) such as fingerprint ridges 610, and larger scale features 690 such as the gaps between adjacent fingers, or also structures such as palm or finger creases from skin folding and underlying muscles, tendons, etc. The slight cupping of the hand is also indicated in FIG. 28. The small scale features 610 are of a proper scale to present one or more features for tracking within the lateral field of view, which for typical sensors and typical unity-magnification imaging optics is approximately 1 mm wide. Because of their small height, they cast small shadows 410 with good contrast that are also the proper scale for tracking. The large-scale features can present a hindrance to tracking. Not only can they extend deeper than the depth of field of the imaging optics, making them come into and out of focus while passing over the sensitive area 34, but the shadows 490 that they cast make the gaps 690 dark as well, and the large-scale features 690 can make wide dark areas because of their height. Cursor tracking can stop while gaps 690 pass by the sensitive area, an undesirable effect.

Figure 29:
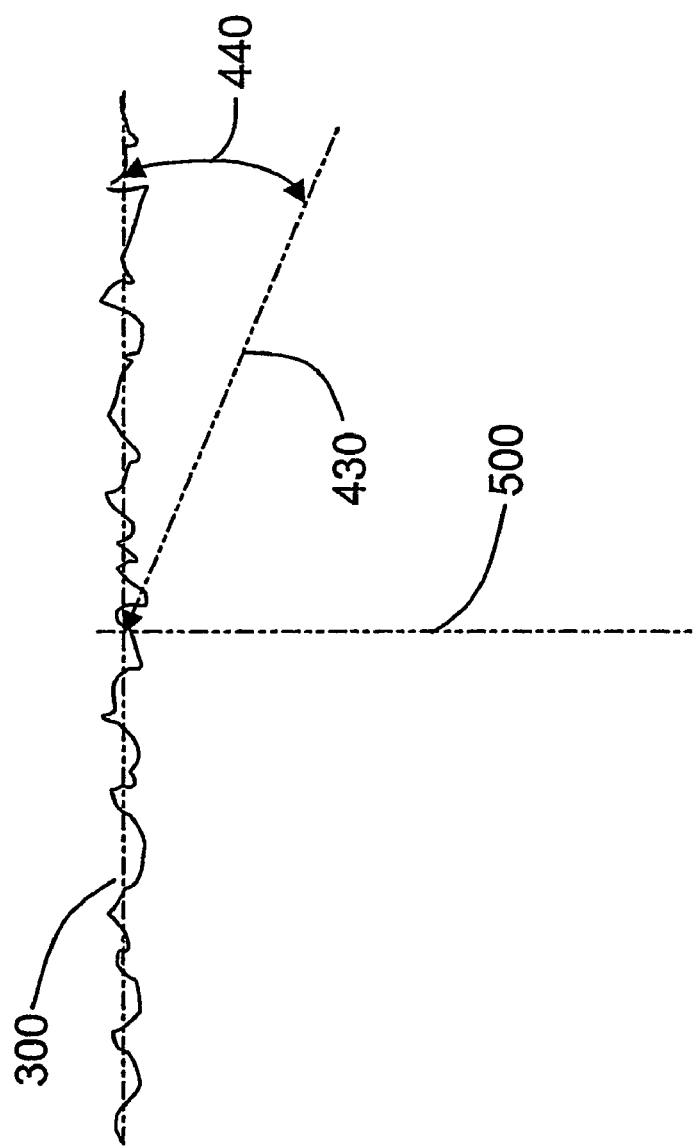
FIG. 29 shows an example of the basic illumination geometry within the plane of the surface to be sensed by the present cursor control device.

The basic illumination geometry is shown in FIG. 29. The plane of the surface to be sensed lies parallel to the object plane 300. The optical axis 500 in general must be approximately parallel to the surface normal in order for the surface to be in focus across the lateral field of view. The central ray (illumination optical axis) or propagation vector 430 of the illumination light pattern 400 is incident on the surface at an angle 440, which can range from zero to 90 degrees. An angle 440 that is closer to zero degrees (in the range zero to 45 degrees) corresponds to grazing incidence, whereas an angle closer to 90 degrees (in the range 45 to 90 degrees) corresponds to normal incidence. There is an optimum angle for illumination that is within the grazing incidence range. If angle 440 is too small (too grazing), then the shadows cast by surface roughness are too long, and most of the illumination light is scattered parallel to the surface and fails to make it into the imaging optics—hence, the illumination is inefficiently used and the surface looks dark to the sensor, with a few bright highlights. If angle 440 is too large (too normal), then there are relatively few shadows, and illumination fills in the valleys on the surface. Thus the sensor has too few features to track unless there are dark and light absorptive and reflective patterns on the surface. The optimum angle for most surfaces of interest lies in a range from 15 to 35 degrees, most preferably 30 degrees, which results in optimally contrasting and sized shadows cast by the surface roughness features, and sufficient light scattered toward the sensor.

Figure 30:
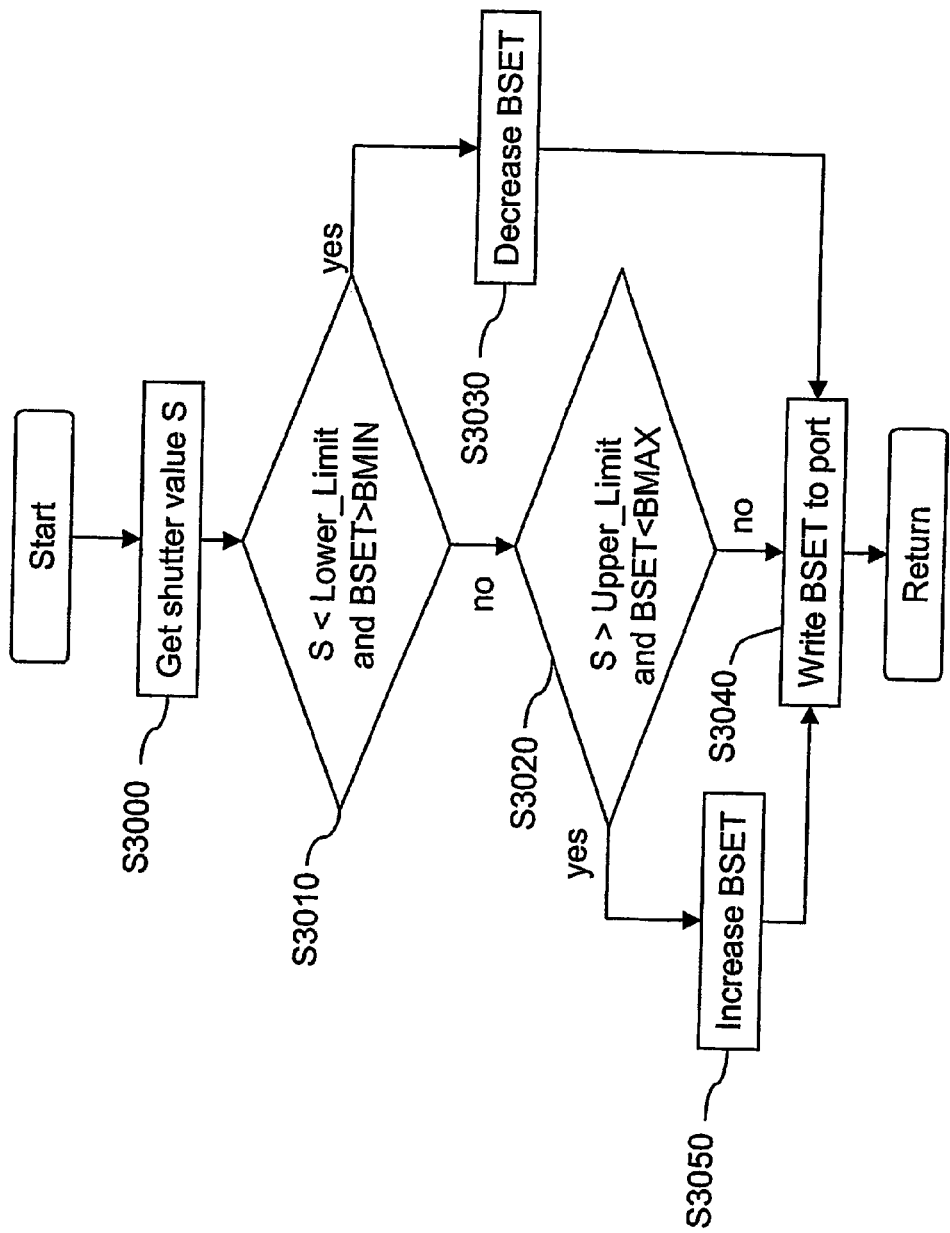
FIG. 30 shows a flowchart illustrating an example of an adaptive illumination process.

The most difficult surfaces to track are those that are light colored and relatively smooth. These tend to force the sensor 80 to operate with limited dynamic range near its minimum shutter value, washing out features. Human hands are also translucent, and high illumination levels can "bleed" into the shadows. In these cases it is desirable to use a relatively low illumination intensity. In order to also accommodate tracking of dark-colored surfaces and large shadowed areas on light surfaces, an adaptive illumination process which adjusts the intensity of the light source 70 in response to the surface darkness can be implemented. A flowchart is shown in FIG. 30 illustrating an example of an adaptive illumination process. The process involves adjusting a light source intensity value BSET, which in turn is used for controlling the intensity of light emitted by the light source 70. Not shown is an optional step, for example performed at power-up, of initializing a light source intensity value BSET to a predetermined value, for example a mid-range value. The image processor 82 or controller 84 can be adapted to perform all or part of this process as described below in connection with FIG. 30, however it will be appreciated that a separate processing device (not shown) can be provided for performing all or part of this process, including a remote processing device such as in a client computer.

Referring now to FIG. 30, at step S3000 the image processor 82 (or controller 84) receives a shutter value S from the sensor 80. At step S3010, the shutter value S is compared against a lower threshold value "Lower_Limit" and the light source intensity value BSET is compared against a minimum light source intensity value "BMIN". As an example, the minimum light source intensity value "BMIN" can be a value at which almost no light is emitted from the light source 70, and the lower threshold value "Lower_Limit" can be a shutter value at a lower end of an optimum dynamic range of shutter values for ideal operation of the sensor 80. If the shutter value S is less than the lower threshold value "Lower_Limit" and the light source intensity value BSET is above the minimum light source intensity value "BMIN" ("yes" at step S3010), it is judged that the light source is too bright, so the light intensity value BSET is decreased at step S3030. Otherwise ("No" at step S3010) the process continues to step S3020, where the shutter value S is compared against an upper threshold value "Upper_Limit" and the light source intensity value is compared against a maximum light source intensity value "BMAX". As an example, the maximum light source intensity value "BMAX" can be a value for which the light source 70 emits a maximum operating intensity, and the upper threshold value "Upper_Limit" can be a shutter value at an upper end of an optimum dynamic range of shutter values for ideal operation of the sensor 80. If the shutter value is higher than the upper threshold limit and the light source intensity is less than the maximum light source intensity value ("yes" at step S3020), it is judged that the light source is too dim, so the light intensity value BSET is increased at step S3050. Otherwise ("no" at step S3020) no change is made to the light intensity value BSET and the process continues to step S3040. At step S3040, the light intensity value BSET is provided for control of the light source 70, for example by writing the value to a port. It should be noted that if the light intensity value is at its limit (BMIN or BMAX), it cannot be adjusted further in the same direction, which is a phenomenon accounted for in this process by including the checks of BSET in steps S3010 and S3020. In addition, it is preferable to increment the intensity by small steps rather than to make a large adjustment, in order to allow electronic shutter or AGC adjustments within the sensor 80 to settle before the next pass through the adaptive illumination routine.

FIGS. 31A and 31B show a hardware implementation that can be used in conjunction with the process shown in FIG. 30. It will be appreciated that the controller 84 can instead be an image processor 82, and/or the image processor 82 can be incorporated into the sensor 80. Another option is that sensor 80 can be or include a second sensor 80' used solely for detecting an intensity of light, in which case the process can be implemented, for example, for optimizing the dynamic range of a first sensor 80. Here, analog current or voltage settings are used to set the intensity of the light source 70, which in this case is embodied as an LED. As shown in the block diagram of FIG. 31A, the system controller 84 (which can alternatively or in combination be an image processor 82) uses output ports to control a digital to analog converter (DAC) 87. The DAC 87 in turn provides a low-level analog control signal to an LED driver 93. The LED driver 93 provides an amplified current to the LED light source 70. FIG. 31B shows a specific implementation of a simple DAC 87 using a binary-weighted resistor ladder driven directly by output ports of the controller 84 and summed in an operational amplifier. Alternative embodiments could use binary pulse-width modulation or other temporal modulation schemes to control the average intensity of the illumination instead of an analog signal. If temporal modulation schemes are used, then care must be taken to avoid interfering with the operation of the sensor by synchronizing the illumination to avoid beating with the frame rate or interference with electronic shutter operation.

As discussed above in connection with FIG. 28, a human hand or a glove has characteristics that must be accommodated in order to be tracked reliably and provide a satisfying user experience. A hand or glove moving across the sensitive area 34 has larger scale features 690 such as joints, jewelry, and gaps between adjacent fingers that come into and out of focus while passing over the sensitive area 34. Thus, as a user passes several fingers across the sensitive area 34, the cursor tracking is intermittent. A period when a gap between two fingers is moving across the sensitive area 34 can be indistinguishable by the sensor 80 from a period when nothing is moving across the sensitive area 34. Thus, while a user intuitively expects smooth, continuous cursor motion as their adjacent fingers are moving across the sensitive area 34, the interpretation of the user's motion by the sensor 80 instead provides jagged, uneven cursor motion due to intermittent tracking of the series of tracked fingers and untracked gaps between fingers. This type of unexpected response can be undesirable for a user, particularly when the user is trying to move the cursor along a curved path.

In order to address this problem, the present invention incorporates curved path projection processing for improving cursor response to user input. Curved path projection processing involves a process of enhancing measured tracking data reported by the sensor and reporting the enhanced tracking data to the client device. The process includes making a determination of how much confidence can be placed on the measured tracking data reported by the sensor, and then generating enhanced tracking data that is based on projected tracking data, measured tracking data, or a combination of the two each respectively weighted according to the degree of confidence. An exemplary embodiment is shown in the pseudocode below, which can be used as the basis for code used for controlling a microprocessor or similar such device.

Figure 32:
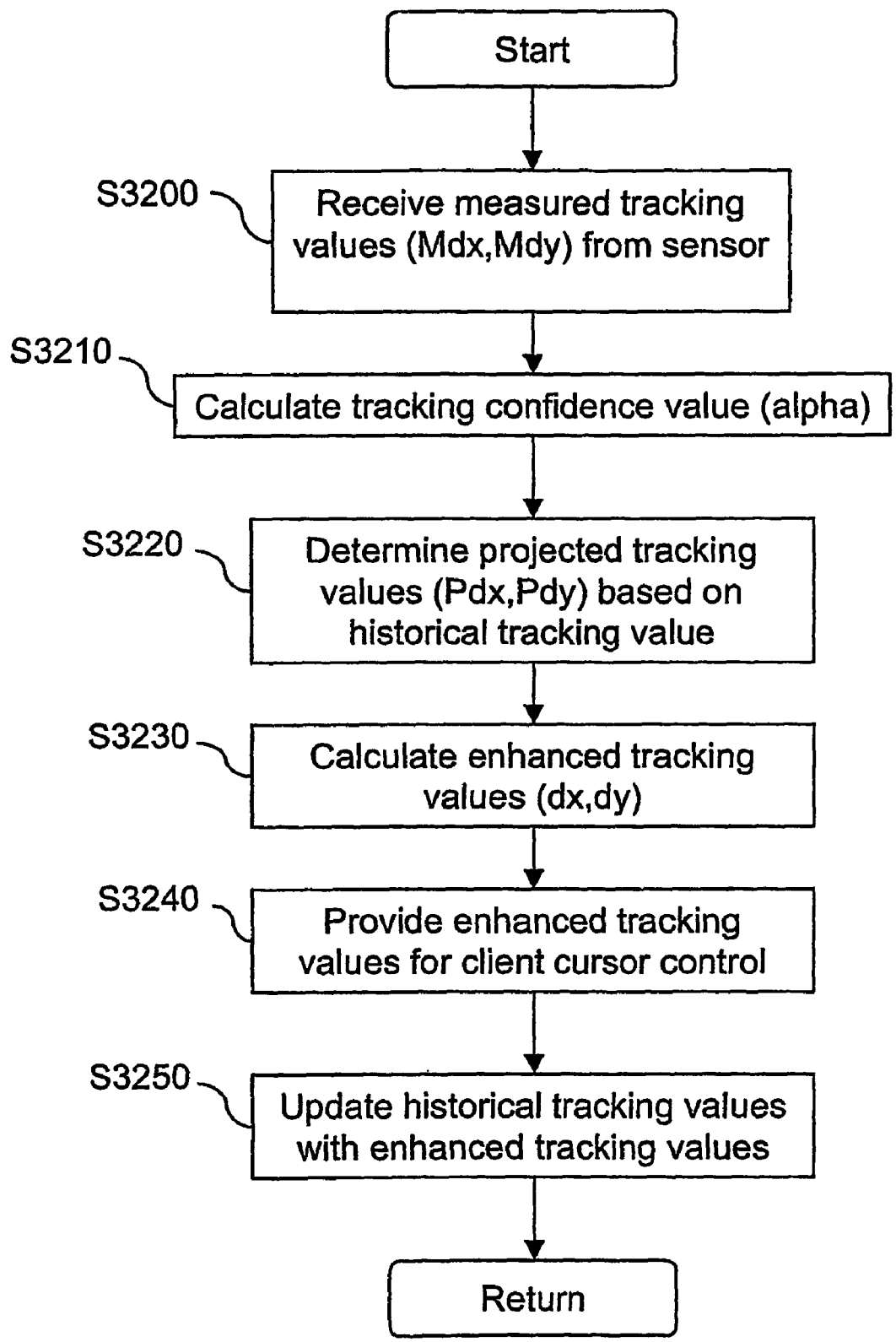
FIG. 32 shows a flowchart illustrating an example of a curved path projection process.
Figure 33:
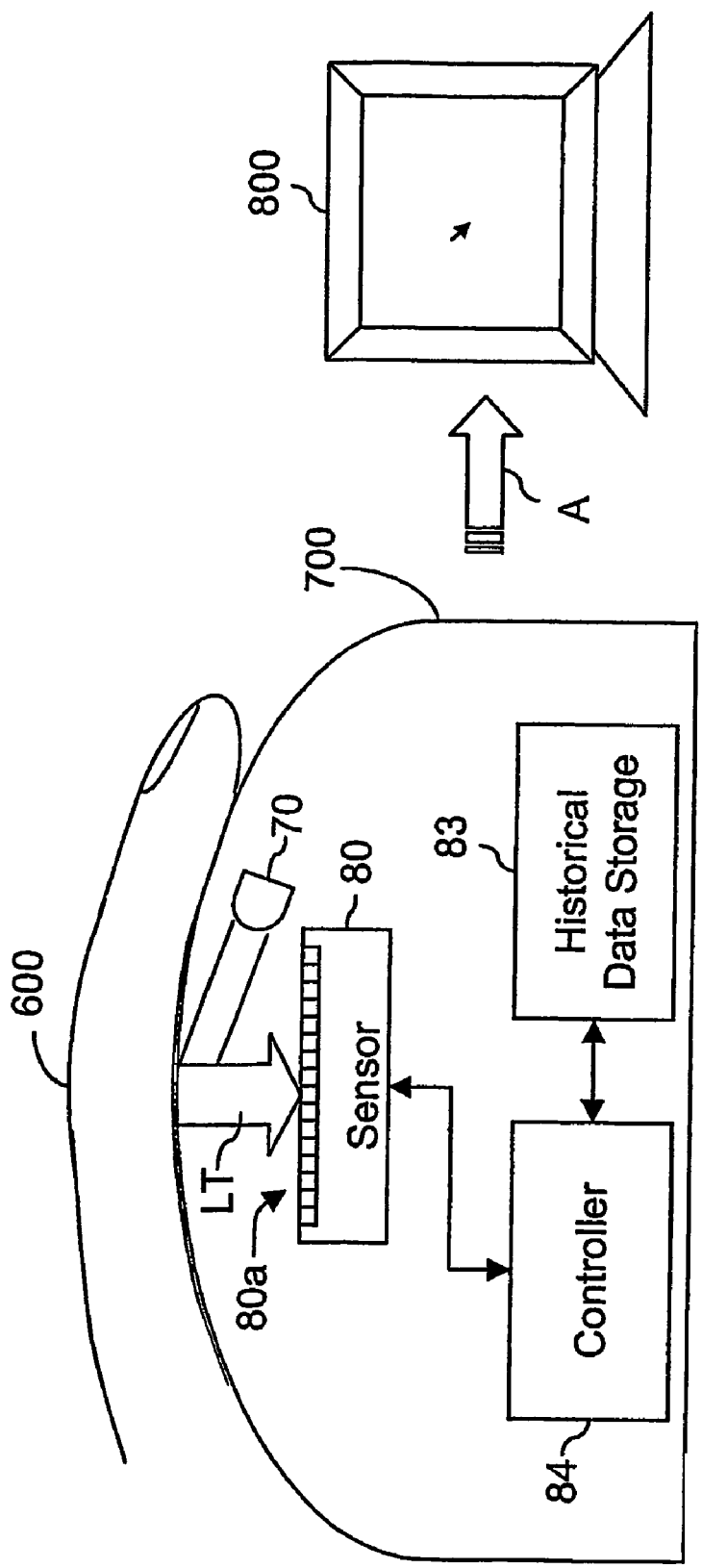
FIG. 33 is a schematic block diagram illustrating an example of a hardware implementation that can be used to perform the process shown in FIG. 32.

The curved path projection processing will now be discussed in greater detail with reference to FIGS. 32 and 33. FIG. 32 shows a flowchart illustrating steps included in the curved path projection process. FIG. 33 is a schematic block diagram illustrating an example of a hardware implementation suitable for performing the curved path projection processing. The view shown in FIG. 33 includes a cursor control device 700 providing enhanced tracking values via communication means (indicated by arrow "A") for a client device 800, for example a computer display. Such communication means can include wired and/or wireless data transmission devices. At step S3200, the controller 84 receives measured tracking (i.e., motion increment) values "Mdx, Mdy" from the sensor 80. For example, in a case where the sensor 80 is an optical sensor having a two-dimensional array of photosensitive elements (indicated generally at 80a), at certain intervals the sensor 80 can scan the element array 80a and interpret variations between sensed patterns of consecutive scans as motion. Such motion would typically result from a user interaction, for example a user's finger 600 reflecting light LT from the light source 70 onto the sensor 80. The sensor 80 can include a register that stores measured tracking values for this detected motion in each of an x (Mdx) and y (Mdy) direction where x and y represent orthogonal directions across the element array 80a. The controller 84 can be configured to request the measured tracking values Mdx and Mdy from the sensor 80 together or independent of one another as necessary.

After receiving the measured tracking values Mdx and Mdy, the process continues to step S3210, where a confidence calculation is performed for determining a tracking confidence value "alpha". Preferably, the tracking confidence value ranges from a first value indicative of no detectable tracking by the sensor to a second value indicative of a high probability that motion is accurately being tracked. In the exemplary embodiment (shown in the pseudocode below) the tracking confidence value is equal to zero for no detectable tracking and one for highly reliable tracking. In the exemplary embodiment, alpha is calculated based on an illumination value "illumination". The illumination value is calculated by the controller 84 using an equation that involves a shutter value "shutterval" and a value representative of an intensity of light ("BSET-BMIN", discussed above) being emitted from the light source 70. The shutter value will typically provide an indication of the intensity of light incident on the array of photosensitive elements 80a. Thus, the illumination value provides an indication of the intensity of light detected by the sensor 80 taking into account the intensity of light being emitted by the light source 70. It can therefore be determined how much of the light being emitted by the light source 70 is being reflected back to the sensor 80. For example, if a user's finger 600 is moving across the sensitive area 34, a significant percentage of the light LT from the light source 70 can be reflected back to the sensor 80, in which case a high degree of confidence can be placed on the resultant measured tracking data Mdx, Mdy. On the other hand, if a gap 690 between the user's fingers is moving across the sensitive area 34, only a small percentage of the light LT from the light source 70 can be reflected back to the sensor 80 (for reasons discussed above), so a reduced degree of confidence is placed on the resultant tracking data Mdx, Mdy, which as discussed above might falsely indicate a lack of motion. Thus, the tracking confidence value "alpha" is determined based on the illumination value "illumination".

Once the tracking confidence value "alpha" has been determined, the process proceeds to step S3220, where projected tracking values ("Pdx,Pdy") are determined. Here, the controller 84 performs a projection calculation for determining the projected tracking values Pdx, Pdy. In the exemplary embodiment (shown in the pseudocode below) the projected tracking values are calculated based on historical data obtained from historical data storage 83. It will be appreciated that the historical data storage 83 can be embodied as a separate memory within the cursor control device 700 as shown in FIG. 33, or in some other way, for example as a resident memory within the controller 84 or a memory device external to the cursor control device 700. The historical data in the exemplary embodiment includes information calculated during a previous iteration of the curved path projection process, including information indicative of an average curvature ("K", i.e., length of the curvature vector) of curvature values stored in a curvature history buffer ("Khist"), information indicative of arc length per unit time ("speed", i.e., incremental arc length), information indicative of a previous enhanced motion vector normalized per incremental arc length ("tx, ty"), information indicative of an angle by which a unit vector normal to the curve last rotated ("cosw, sinw"), and components of the unit vector normal to the curve ("nx, ny"). This information is used in conjunction with a delta time since the last iteration ("dt") to determine a projected motion vector by calculating projected tracking values Pdx, Pdy.

Once the projected tracking values have been determined, the process continues to step S3230, where the enhanced tracking values (dx,dy) are determined. In step S3230 the controller 84 performs an enhancement calculation for determining the enhanced tracking values dx, dy. In an exemplary embodiment (shown in the pseudocode below) the enhanced tracking values are calculated based on the equations:

$$dx = (Mdx)*\text{alpha} + (1.0-\text{alpha})*Pdx \quad \text{[Eq. 1]}$$

$$dy = (Mdy)*\text{alpha} + (1.0-\text{alpha})*Pdy \quad \text{[Eq. 2]}$$

wherein dx,dy are the enhanced tracking values, Mdy, Mdy are the measured tracking values received from the sensor 80, alpha is the tracking confidence value, and Pdx, Pdy are the projected tracking values. In the exemplary embodiment, since the tracking confidence value alpha is equal to zero for unreliable measured tracking data, according to the above equations enhanced tracking values dx, dy will equal the respective projected tracking values Pdx, Pdy when the measured tracking data is unreliable. In other words, if the measured tracking data from the sensor 80 is not reliable according to the value of the tracking confidence value alpha, then the enhanced tracking values are set equal to the projected tracking values, and in turn communicated to the client device 800 for cursor control. On the other hand, since the tracking confidence value alpha is equal to one in the case of highly reliable measured tracking data, according to the above equation enhanced tracking values dx, dy will be set equal to the measured tracking values Mdx, Mdy when the measured tracking data is highly reliable. Thus, if the measured tracking data is judged to be highly reliable according to the value of the tracking confidence value alpha, then the enhanced tracking values are set equal to the measured tracking values, and in turn are communicated to the client device 800 for cursor control. A third possibility is that the tracking confidence value alpha is equal to a value between zero and one. That is, there exists only a degree of uncertainty (or confidence) in the measured tracking data. In this case, the enhanced tracking value will be equal to a sum of the measured tracking values and the projected tracking values, where each of the measured and projected tracking values are weighted according to the degree of uncertainty as indicated by the value of the tracking confidence value alpha.

Once the enhanced tracking values have been determined, the process continues to step S3240, where the enhanced tracking values are provided to the client device 800 for cursor control. Then, at step S3250, historical data is updated. In the exemplary embodiment (shown in the pseudocode below) the enhanced tracking values dx, dy are used to update the current curvature K, tangential speed vector tx, ty, and the unit normal vector nx, ny. In addition, the tracking confidence value is used to retard the tangential speed according to a parameter "beta" when the tracking confidence value indicates unreliable measured tracking values (i.e., alpha<1). This acts as a safeguard against issuance of projected tracking values Pdx, Pdy for an undesirably extended period of time.

This is referred to in the code below as "speed bleed" referring to the gradual decrease in tangential speed occurring according to the following equation:

$$\text{newspeed} = \text{oldspeed} * (\beta + \alpha * (1.0 - \beta * \alpha)) \quad [\text{Eq. 3}]$$

Note that in the code below, both "newspeed" and "oldspeed" are simply referred to as "speed". Preferably, beta is a value between zero and one and controls the rate of decay of tangential speed. According to equation 3, when the tracking confidence value alpha is lower than one, indicating at least a degree of uncertainty associated with the measured tracking data, then newspeed is decreased according to the value of beta. For example, in a case where the tracking confidence value is zero (no reliable measured tracking data), newspeed will equal oldspeed*beta. Thus, for alpha=0, if beta equals 0.25 then the newspeed will be 25% of the oldspeed, or if beta equals 0.75 then newspeed will be 75% of the oldspeed. In other words, decay rate is inversely proportional to the value of beta. On the other hand, if the measured tracking values Mdx, Mdy are highly reliable, then alpha=1 and newspeed is set equal to the oldspeed (i.e., the tangential speed does not decay).

Once the historical data has been updated at step S3250, the curved path projection process ends. One exemplary pseudocode listing which may be used to implement the curved path projection processing is set forth below.

```
/* The following code is Copyright © 2003 by ITAC Systems, Inc.
   The following GLOBAL variables constitute the current and
   historical STATE of the system:
/*
int
   index,         //Index into circular buffers for running statistics
const int
   cbuflen=32;    //suggested length for the statistics circular buffer
   A=1000;        //suggested value (experimentally determined)
   B=1750;        //suggested value (experimentally determined, but > A)
   lowalpha=0.3;  //tracking confidence value threshold for "still"
   stillxy=5;     //measured dx or dy below which measurement is
"still"long
   illumination,  //Illumination value from shutter and brightness
   alpha,         //the tracking confidence value
   beta,          //velocity bleed rate parameter
   Mdx,           //measured X-increment, obtained from sensor
   Mdy,           //measured Y-increment, obtained from sensor
   dt,            //delta-time since last sample
   Pdx,           //Projected X-increment
   Pdy,           //Projected Y-increment
   dx,            //enhanced X-increment to be delivered to Client
   dy,            //enhanced Y-increment to be delivered to Client
   ds,            //incremental arc length = sqrt(dx^2 + dy^2).
   clk,           //present clock reading
   speed,         //cursor speed (arc length per unit time)
   tx,            //X-component of unit tangent vector
   ty,            //Y-component of unit tangent vector
   Knx,           //X-component of the curvature vector
   Kny,           //Y-component of the curvature vector
   K,             //length of the curvature vector, a.k.a. the curvature
   Khist[cbuflen],//history of curvature of length cbuflen
   index,         //index into the khist buffer
   nx,            //X-component of unit normal to the curve
   ny,            //Y-component of unit normal to the curve
   cosw,          //cosine of angle (nx,ny) rotates each time
   sinw;          //sine of angle (nx,ny) rotates: each time
//The following "old" values are updated before returning
   clkold,
   dxold,
   dyold,
   dsold,
   txold,
   tyold,
   nxold,
   nyold;
```

```
void RESET( ) {
// Initialize state variables prior to first interrupt
   speed=0; K = 0;
   tx = ty = 0;
   txold = tyold = 0;
   dsold = 0;
   nxold = nyold = 0;
   for(index=0;index++;cbuflen) Khist[index]=0.;
   index = 0;
   clk = gettime( );
}
void START( ) {
////////////////////////////////////////////////////////////////////////
// Get (MdX,MdY) and tracking data from Sensor
// Compute the tracking confidence value (alpha) and other necessary
values
// Apply "still" threshold to measured dx and dy
////////////////////////////////////////////////////////////////////////
   // Get values from the sensor chip.
   PollSensor(*Mdx, *Mdy, *shutterval, *BSET, BMIN);
   illumination = shutterval*(BSET-BMIN)/4;
   alpha = 1.0 - max(0.0,min(1,0 (illumination - A)/(B - A) ));
   // alpha is the "tracking confidence value": alpha = 1 for perfect
   tracking
   if ((Mdx <= stillxy) and (Mdy <= stillxy) and (alpha <= lowalpha))
       Mdx = 0; //if confidence is low and Mdx and Mdy are both
       small,
       Mdy = 0; //then apply "still" threshold to both Mdx and Mdy
   clkcold = clk;
   clk = gettime( );
   if(clkold > clk)
       clkcold = clkold - MAXTIME; // protect against time-wrap
   dt = clk - clkold;
////////////////////////////////////////////////////////////////////////
// Project (Pdx,Pdy) from the History
// (cf: Lindgren, B.W., Vector Calculus, McMillan, New York,
1964, p.63)
////////////////////////////////////////////////////////////////////////
   ds = speed*dt; // Note that speed is from the history.
   // The following two statements rotate the unit radius vector
   // through a fixed angle.
   nx = K*(cosw*nxold - sinw*nyold);
   ny = K*(sinw*nxold + cosw*nyold);
   dsK = ds*K;
   // The following two statements scale the unit normal vector
   // and add it to the previous tangent vector.
   // Note that previous tangent vectors were calculated during previous
   // iteration using enhanced dx, dy from that previous iteration.
   xtndx = tx + dsK*nx; // resultant of prior tangent and present
   curvature (x)
   xtndy = ty + dsK*ny; // resultant of prior tangent and present
   curvature (y)
   lenxtnd = sqrt(xtndx*xtndx + xtndy*xtndy);
   // The following two statements renormalize the tangent vector
   // for use in the next iteration.
   tx = xtndx/lenxtnd; // new tangent vector (x)
   ty = xtndy/lenxtnd; // new tangent vector (y)
   // The following two statements scale the tangent vector to account
   for the speed
   // of cursor motion resulting in the new projected motion vector
   (Pdx,Pdy).
   Pdx = ds*tx;
   Pdy = ds*ty;
////////////////////////////////////////////////////////////////////////
// Compute enhanced (dx,dy) from sensor (Mdx,Mdy) and from (Pdx,Pdy)
// and deliver it to the Client
////////////////////////////////////////////////////////////////////////
   dx = Mdx*alpha + (1.0-alpha)*Pdx;
   dy = Mdy*alpha + (1.0-alpha)*Pdy;
   DeliverToClient(dx,dy);
////////////////////////////////////////////////////////////////////////
// Update the History
////////////////////////////////////////////////////////////////////////
   ds = sqrt(dx*dx+dy*dy);
   if(ds==0) {
       //No motion
       RESET( );
   }
   else {
```

-continued

```
    speed = ds/dt;
    speed = speed*(beta+alpha*(1.0-beta*alpha)); // "Speed Bleed"
    tx = dx/ds;
    ty = dy/ds;
    dsAvg = 2.0/(ds + dsold);
    Knx = (tx - txold)*dsAvg;
    Kny = (ty - tyold)*dsAvg;
    K = sqrt(Knx*Knx + Kny*Kny);
    // smooth out the historical values of curvature K.
    Ksum = Ksum + K - Khist[index];
    Khist[index] = K;
    index = mod(index+1,cbuflen); // Increment index modulo
    cbuflen
    K = Ksum/(float)cbuflen;
    // end smoothing
    nx = Knx/K
    ny = Kny/K;
    sinw = nx*nyold - ny*nxold;
    if(sinw == 0.) cosw = 1.;
    else cosw = nx*nxold + ny*nyold;
    txold = tx;
    tyold = ty;
    nxold = nx;
    nyold = ny;
    dxold = dx;
    dyold = dy;
    dsold = ds;
  }
/////////////////////////////////////////////////////////////////////////////////////////////
// Return from Interrupt
/////////////////////////////////////////////////////////////////////////////////////////////
    Return;
}
```

The above pseudocode may be used to form the basis of a control program for controlling a software-driven processor. However, it will be appreciated that this pseudocode represents only an embodiment of the inventive concept, and can vary without departing from the scope of the present invention. For example, it will be noted that the projected tracking values are calculated but not used in a case where the tracking confidence value alpha is equal to one (i.e., highly reliable measured tracking values). Thus, it is contemplated that the process of calculating the projected tracking values could be bypassed if the tracking confidence value is equal to one.

There are also various structural changes contemplated that could be made for the above-described cursor control devices. For example, rather than sealing a device, one or more intentional "bleed" paths to allow communication between the inside and outside of the housing and/or dome can be desirable in some cases to allow internal condensation to evaporate. This can be desirable in cold environments. Such a bleed hole could be kept behind a panel if the front of the panel was sealed from the back, allowing the front of the panel to get wet. Means for such sealing in the form of gaskets and seals have already been described.

Alternative imaging optics could employ one or more gradient-index (GRIN) lenses as used in medical endoscopes to transfer the image from the sensitive area to the image sensor. Coherent fiber bundles (fiber-optic faceplates) have been proposed for use in optical mice by Nestler in U.S. Pat. No. 4,716,287. If it has sufficient resolution, this type of optic, used to relay the image from the sensitive area on the top surface of the dome to an intermediate image plane or directly to the surface of the image sensor, has the advantage of naturally short depth of field, requiring substantial contact with the surface to be imaged.

Wireless transmission of cursor control signals is possible by installing more elaborate transmission means in place of a wired electrical connector. A battery internal or external to the housing could supply power to the cursor control device. The device then could be easily installed in retrofit applications where there is poor access to wiring, used in portable or handheld applications, or simply to reduce desktop clutter.

Many variations on device appearance are also possible. Secondary illumination sources of the same or different visible colors can be used to cause the dome to glow in an interesting fashion as long as appropriate baffle or filtering means are provided to prevent interference with the operation of the primary illumination system. Painted, printed, patterned, or textured bezels of many materials are possible, perhaps with attached decorative accessories, containing decorative pictures, instructive legends, or fanciful designs such as eyelids and eyelashes. In the outer ring of the dome, on either the front or back surface, decorative or tactile features can easily be incorporated to improve or alter the appearance and/or function of the device. Appearance variations can be used to "personalize" the product for different OEM customers.

One interesting design would be to incorporate the front surface of the dome into the surface of a spherical enclosure ("ball") that can sit on a tabletop. If the spherical enclosure and cursor control device housing were made of a clear or colored transparent material, then the effect could be that of a "crystal ball" which is used to control cursor position or perform other command functions through stroking the dome. It is not necessarily undesirable to reveal the electronic workings of the device; there are already optical mice with transparent housings. The dome could be positioned on the top or any side of the ball. Using wireless transmission as already mentioned, the cursor control device could take the form of a "crystal" paperweight that could be placed anywhere on a desk when not in use.

Switches can be incorporated internally to the housing of the device, for example using a secondary "housing within a housing." A single push-type switch could be operated by pressing the dome as if it were a pushbutton. A pull-type action could also be used, for example for an emergency stop. Directional pads or switches could be integrated under the dome to that applying an off-center force to the dome could be used to move a different cursor, achieve a coarser or finer cursor motion, or to simply integrate more switches into a small space.

Vibratory tactile feedback could be incorporated by installing a piezoelectric or other vibrator under the dome. This could be used to feed back alarms, indicate end of travel of a cursor, or provide other indications to an operator whose hand is in contact with the dome.

It can thus be seen that the invention has met the object of providing a cursor control device that uses an optical image sensing tracking system and hence requires no moving parts to change cursor position. It provides much of the user experience of a trackball by presenting a panel-mounted dome to the user of appropriate size and shape to give good visual and tactile feedback. It can be sealed from the environment and/or against the panel in which it is mounted to avoid contamination. It uses low-angle illumination to provide enhanced tracking of a variety of surfaces such as gloved hands, shoed feet, or clothing. It is compact in size and suitable for mounting in a variety of panels, surfaces, and enclosures. This cursor control device has the advantages of being highly intuitive and ergonomic to operate. It easily works in any orientation, and has a compact size relative to conventional trackballs.

There are many potential applications for this new type of cursor control device. Besides being of great utility in industrial controllers for production equipment, it has considerable advantages for consumer and business applications. Automobile controls for various functions could be controlled by a device like this installed, for example, in part of the steering wheel, in a console, or on a shift lever or shift knob, with the great advantage of having a control that it is not necessary to look at to operate. Aerospace controls for various functions can similarly be controlled by a device according to the present invention. Gaming controllers using this "engine" would profitably be configured with wireless connections, battery power, and additional integral switches as described above. Similar versions could be configured for handheld controllers for presentations, while the same type of device will readily be incorporated into a speaker's podium. Reducing the number of required controls or knobs is desirable in entertainment equipment such as remote control devices, televisions, audio receivers and video players.

Although the above description contains many specific details, these should not be construed as limiting the scope of the invention but as merely providing illustrations of some of the embodiments of this invention. For example, light sources of different types other than LEDs are easily employed. Different materials for the components such as glass domes or metal housings can be used, or the size of the apparatus can be altered, such as to make a large dome more like a conventional trackball. The device can be mounted in a free-standing housing instead of mounted in an equipment panel.

What is claimed is:

1. In a computer system having a processor operatively coupled to a cursor control device and a cursor, the cursor control device further including a light source and a sensor, a method of moving the cursor comprising the steps of:
    programming the processor with a set of instructions;
    using the processor and the instructions to perform the steps of:
    determining a measured tracking value representative of motion of the cursor control device sensed by the sensor;
    performing a projection calculation for determining a projected tracking value, the projection calculation involving a historical tracking value;
    calculating a tracking confidence value based on an illumination value representative of an intensity of light sensed by the sensor;
    generating an enhanced tracking value representative of a sum of the tracking confidence value multiplied by the measured tracking value and a value of (1−the tracking confidence value) multiplied by the projected tracking value; and,
    moving the cursor according to the enhanced tracking value.

2. A method according to claim 1, wherein the sensor provides a pair of measured tracking values representative of motion of the cursor control device,
    wherein the step of performing a projection calculation includes determining a pair of projected tracking values using a pair of historical tracking values,
    wherein the step of generating an enhanced tracking value includes determining a pair of enhanced tracking values; and,
    wherein the step of moving the cursor includes moving the cursor according to the pair of enhanced tracking values.

3. A method according to claim 2, wherein each of the pair of measured tracking values, projected tracking values, historical tracking values, and enhanced tracking values is representative of motion in a respective one of a pair of orthogonal directions.

4. A method according to claim 1, wherein the step of calculating a tracking confidence value further comprises the step of performing an illumination calculation for determining the illumination value, the illumination calculation involving a shutter value received from the sensor for a subject sensor scan and a brightness value indicative of an amount of light emitted from the light source during the subject sensor scan.

5. A method according to claim 4, wherein the illumination value is representative of an intensity of light sensed by the sensor during the subject sensor scan.

6. A method according to claim 5, further comprising the step of controlling the intensity of light emitted by the light source.

7. A method according to claim 6, wherein the step of controlling the intensity of light emitted by the light source includes controlling the intensity of light based on a shutter value signal received from the sensor.

8. A method according to claim 6, wherein the step of controlling the intensity of light emitted by the light source includes controlling the intensity of light based on a contrast signal received from the sensor.

9. A method according to claim 6, wherein the illumination value is based on information received from the sensor and an intensity at which the light source is controlled during the step of controlling the intensity of light.

10. A method according to claim 1, wherein the enhanced tracking value is such that if the tracking confidence value is a first value then the enhanced tracking value is equal to the measured tracking value, and if the tracking confidence value is a second value then the enhanced tracking value is equal to the projected tracking value.

11. A method according to claim 10, wherein the enhanced tracking value is such that if the tracking confidence value is a third value then the enhanced tracking value is equal to a weighted combination of each of the measured tracking value and the projected tracking value.

12. A method according to claim 1, wherein the measured tracking value is representative of motion sensed by the sensor during a subject sensor scan, and the historical tracking value is related to at least one sensor scan prior to the subject sensor scan.

13. A method according to claim 12, wherein the historical tracking value is calculated using the enhanced tracking value for said at least one sensor scan prior to the subject sensor scan.

14. A method according to claim 1, wherein the step of generating an enhanced tracking value includes the further step of applying the formula:

$$dx = (Mdx)*\text{alpha} + (1.0 - \text{alpha})*Pdx$$

wherein:
    dx is the enhanced tracking value;
    mdx is the measured tracking value;
    alpha is the tracking confidence value; and,
    Pdx is the projected tracking value.

15. A method according to claim 1, further comprising the step of storing the enhanced tracking value.

16. A method according to claim 15, wherein the steps of performing a projection calculation, calculating a tracking confidence value and generating an enhanced tracking value are repeated using the stored enhanced tracking value as a basis for determining the historical tracking value.

* * * * *